United States Patent
DeRosa et al.

(10) Patent No.: US 10,640,654 B2
(45) Date of Patent: May 5, 2020

(54) OPTICAL FIBER COATING AND COMPOSITION WITH UV-ABSORBING ADDITIVE

(71) Applicant: Corning Incorporated, Corning, NY (US)

(72) Inventors: Michael Edward DeRosa, Painted Post, NY (US); Michelle Dawn Fabian, Horseheads, NY (US); Stephan Lvovich Logunov, Corning, NY (US); James Robert Matthews, Painted Post, NY (US); Manuela Ocampo, Corning, NY (US)

(73) Assignee: Corning Incorporated, Corning, NY (US)

( * ) Notice: Subject to any disclaimer, the term of this patent is extended or adjusted under 35 U.S.C. 154(b) by 407 days.

(21) Appl. No.: 15/352,057

(22) Filed: Nov. 15, 2016

(65) Prior Publication Data

US 2017/0158862 A1 Jun. 8, 2017

Related U.S. Application Data

(60) Provisional application No. 62/263,943, filed on Dec. 7, 2015.

(51) Int. Cl.
*C09D 4/00* (2006.01)
*B29D 11/00* (2006.01)
(Continued)

(52) U.S. Cl.
CPC .......... *C09D 4/00* (2013.01); *B29D 11/00663* (2013.01); *C03C 25/106* (2013.01);
(Continued)

(58) Field of Classification Search
CPC ...... C09D 4/00; C03C 25/106; G02B 6/02395
See application file for complete search history.

(56) References Cited

U.S. PATENT DOCUMENTS

| 4,076,380 | A | 2/1978 | DiMarcello |
| 4,176,911 | A | 12/1979 | Marcatili |

(Continued)

FOREIGN PATENT DOCUMENTS

| WO | 2005103121 | 11/2005 |
| WO | 2011075549 | 6/2011 |

OTHER PUBLICATIONS

Feng and Suh, "Exposure reciprocity law in photopolymerization of multi-functional acrylates and methacrylates" Macromolecular Chemistry and Physics, 208, 295-306, 2007.
(Continued)

*Primary Examiner* — Mathieu D Vargot
(74) *Attorney, Agent, or Firm* — Kevin L. Bray

(57) ABSTRACT

A coating composition containing a radiation-curable component, a photoinitiator, and a UV absorber is described. The coating composition may be applied to an optical fiber and cured to form a coating. The UV absorber provides a protective function by inhibiting unintended curing of the coating that may occur upon exposure of the fiber to UV light during fiber processing. The spectral overlap of the photoinitiator and UV absorber is minimized to permit efficient photoinitiation of the curing reaction over one or more wavelengths. Photoinitiation may be excited by an LED source with a peak emission wavelength in the range from 360 nm-410 nm.

20 Claims, 15 Drawing Sheets

(51) Int. Cl.
*C03C 25/106* (2018.01)
*G02B 6/02* (2006.01)
*C03B 37/025* (2006.01)

(52) U.S. Cl.
CPC ........ *G02B 6/02395* (2013.01); *C03B 37/025* (2013.01); *C03C 2217/74* (2013.01)

(56) References Cited

U.S. PATENT DOCUMENTS

| | | |
|---|---|---|
| 4,300,930 A | 11/1981 | Chang |
| 4,402,570 A | 9/1983 | Chang |
| 4,439,008 A | 3/1984 | Joormann |
| 4,474,830 A | 10/1984 | Taylor |
| 4,581,165 A | 4/1986 | Frank |
| 4,662,992 A | 5/1987 | Mirsberger |
| 4,752,112 A | 6/1988 | Mayr |
| 4,921,880 A | 5/1990 | Lee |
| 5,104,433 A | 4/1992 | Chapin |
| 5,162,390 A | 11/1992 | Tilley et al. |
| 5,188,864 A | 2/1993 | Lee et al. |
| 5,486,378 A | 1/1996 | Oestreich |
| 5,559,163 A * | 9/1996 | Dawson ............... C09D 4/00 522/183 |
| 5,729,645 A | 3/1998 | Garito |
| 6,187,835 B1 * | 2/2001 | Szum ............... C03C 25/106 428/30 |
| 6,584,263 B2 | 6/2003 | Fewkes |
| 6,602,601 B2 | 8/2003 | Fewkes et al. |
| 6,611,647 B2 | 8/2003 | Berkey |
| 6,775,451 B1 | 8/2004 | Botelho |
| 8,367,204 B2 | 2/2013 | Uchida |
| 8,628,685 B2 | 1/2014 | He et al. |
| 9,488,774 B2 | 11/2016 | Bookbinder et al. |
| 2003/0099831 A1 * | 5/2003 | Fewkes ............... C03C 25/1055 428/378 |
| 2007/0179224 A1 | 8/2007 | Fanayar et al. |
| 2011/0183081 A1 | 7/2011 | Nakane et al. |
| 2013/0001424 A1 * | 1/2013 | Kusner ............... G01T 3/06 250/362 |
| 2013/0302003 A1 | 11/2013 | Bookbinder et al. |
| 2015/0205199 A1 * | 7/2015 | Baldwin ............... G03F 7/027 430/281.1 |
| 2016/0177092 A1 | 6/2016 | McCarthy et al. |

OTHER PUBLICATIONS

International Searching Authority Invitation to Pay Additional Fees PCT/US2016/064925 dated Mar. 21, 2017.

Shah et al. "An innovation in optical fiber manufacturing process by UV-LED lamps and novel optical fiber coating design supporting both Wet On Wet (WOW) and Wet on Dry (WOD) processing at high speeds" Proceedings of the 63rd IWCS Conference, pp. 416-426.

E. Andrzejewska, "Photopolymerization kinetics of multifunctional monomers", Progress in Polymer Science, vol. 26, pp. 606-665 (2001).

Karazu, Feyza et al., "Free radical photopolymerization initiated by UV and LED: Towards UV stabilized, tack free coatings", J. Polym. Sci., Part A: Polym. Chem. 2014, 52, 3597-3607.

S.D. Vacche et al., "Time-intensity superposition for photopolymerization of fluorinated and hyperbranched acrylate nanocomposites", Polymer, 51, 334-341, 2010.

* cited by examiner

OPTICAL FIBER COATING AND COMPOSITION WITH UV-ABSORBING ADDITIVE

This application claims the benefit of priority under 35 U.S.C. § 119 of U.S. Provisional Application Ser. No. 62/263,943 filed on Dec. 7, 2015 the content of which is relied upon and incorporated herein by reference in its entirety.

FIELD

The present specification relates to optical fiber coating compositions, coatings formed from the compositions, and coated optical fibers. More particularly, the present specification relates to radiation-curable coating compositions that include a UV-absorbing additive. The UV-absorbing additive becomes incorporated in coatings formed from the coating composition. When incorporated in a primary composition, the UV-absorbing additive prevents overcuring of the primary coating during curing of a subsequently applied secondary coating composition.

BACKGROUND

The light transmitting performance of an optical fiber is highly dependent upon the properties of the polymer coating that is applied to the fiber during manufacturing. Typically a dual-layer coating system is used where a soft (low modulus) primary coating is in contact with the glass fiber and a hard (high modulus) secondary coating surrounds the primary coating. The secondary coating allows the fiber to be handled and further processed, while the primary coating plays a key role in dissipating external forces and preventing them from being transferred to the fiber where they can cause microbend induced light attenuation.

The functional requirements of the primary coating place several constraints on the materials that are used for these coatings. In order to prevent bending and other external mechanical disturbances from inducing losses in the intensity of the optical signal transmitted through the fiber, the Young's modulus of the primary coating must be as low as possible (generally less than 1 MPa, and ideally less than 0.5 MPa). To ensure that the modulus remains low when the fiber is exposed to low temperatures during deployment in cold climates, the glass transition temperature of the primary coating must be low (generally less than 0° C., and ideally less than −20° C.) so that the primary coating does not transform to a rigid glassy state. Also, the tensile strength of the primary coating, must be high enough to prevent tearing defects when drawing the fiber or during post-draw processing of the coated fiber (e.g. when applying ink layers or bundling the fiber to form cables). Obtaining the necessary tensile strength is challenging because tensile strength generally decreases as the modulus decreases. This means that the objectives of achieving low modulus conflicts with the objective of achieving high tear strength. Lastly, to ensure uniformity in the thickness of the primary coating, the composition from which the primary coating is formed is applied to the fiber in liquid form. A liquid primary coating composition flows to provide uniform coverage of the fiber to promote uniformity of thickness in the cured state. It is similarly beneficial to employ a liquid phase secondary coating composition. It is desirable, however, to apply a liquid secondary coating composition to the cured state of the primary coating to prevent mixing of liquid phases and potential contamination of the primary coating with components of the secondary coating (and vice versa). To achieve this goal while maintaining high draw speeds, the liquid phase primary coating composition must be capable of curing quickly to form a solidified primary coating having sufficient integrity to support application of a liquid secondary coating composition.

To meet these requirements, optical fiber coatings have traditionally been formulated as mixtures of radiation curable urethane/acrylate oligomers and radiation curable acrylate functional diluents. Upon exposure to light and in the presence of a photoinitiator, the acrylate groups rapidly polymerize to form a crosslinked polymer network which is further strengthened by the hydrogen bonding interactions between urethane groups along the oligomer backbone. By varying the urethane/acrylate oligomer, it is possible to form coatings having very low modulus values while still providing sufficient tensile strength to minimize damage during the draw or post-draw processing. Numerous optical fiber coating formulations have been disclosed in which the composition of the radiation curable urethane/acrylate oligomer has been varied to achieve different property targets.

An important attribute of optical fibers is consistency of performance. The deployment life of an optical fiber typically extends for years, or even decades, and it is essential that the performance of the fiber remain true and not degrade over time. A key attribute of the primary coating is its ability to mitigate signal attenuation resulting from bending or other stresses applied to the fiber. To maintain minimal stress-induced signal attenuation, it is necessary for the modulus of the primary coating to remain constant over time. In order to achieve a desired modulus for the primary coating during initial fabrication, curing conditions are often controlled to control the degree of cure of the primary coating composition. As the degree of cure increases, the primary coating becomes more rigid and achieves a higher modulus. To maintain the modulus within a desired range, the curing reaction of the primary coating is often arrested before completion and the degree of cure is less than 100%. As a result, subsequent processing events that act to increase the degree of cure of the primary coating lead to unintended increases in the modulus of the primary coating and deterioration of the ability of the primary coating to provide the buffering of external forces needed to prevent stress-induced signal losses in the fiber.

Since many primary coating compositions are cured by UV light, exposure of the primary coating to UV light during subsequent processing steps presents the risk of increasing the modulus of the primary coating due to UV-induced reactions that increase the degree of cure. Potential exposure of the primary coating to UV light during processing occurs when applying subsequent layers to the fiber. A secondary coating composition is often applied to the cured primary coating. To form a secondary coating from the secondary coating composition, it is necessary to cure the secondary coating composition with UV light. The UV light can pass through the secondary coating composition to reach the primary coating and alter the degree of curing of the primary coating. Similarly, application of ink layers or buffering layers may also subject the primary coating to exposure from UV light. Exposure of the primary coating to additional intensity of UV light leads to overcuring of the primary coating as well as unpredictability and inconsistency in the modulus and performance of the primary coating. It is accordingly desirable to develop primary coatings with a modulus that is stable to subsequent exposure of the primary coating to UV light during fiber processing.

SUMMARY

A coating composition containing a radiation-curable component, a photoinitiator, and a UV absorber is described. The coating composition may be applied to an optical fiber and cured to form a coating. The UV absorber provides a protective function by inhibiting unintended curing of the coating that may occur upon exposure of the coating to UV light during fiber processing. The spectral overlap of the photoinitiator and UV absorber is minimized to permit efficient photoinitiation of the curing reaction over one or more wavelengths. Photoinitiation may be excited by an LED source with a peak emission wavelength in the range from 360 nm-410 nm. The coating composition may include multiple radiation-curable components and/or a reinforcing agent.

A first aspect relates to:
A coating composition comprising:
   a first radiation-curable component;
   a photoinitiator; and
   a UV absorber;
wherein the ratio of the absorbed intensity of said UV absorber in said composition to the absorbed intensity of said photoinitiator in said composition at a wavelength in the range from 360 nm-410 nm is less than 7.5.

A second aspect relates to the cured product of a coating composition comprising:
   a first radiation-curable component;
   a photoinitiator; and
   a UV absorber;
wherein the ratio of the absorbed intensity of said UV absorber in said composition to the absorbed intensity of said photoinitiator in said composition at each wavelength in the range from 360 nm-410 nm is less than 7.5.

A third aspect relates to:
An optical fiber comprising the cured product of a coating composition comprising:
   a first radiation-curable component;
   a photoinitiator; and
   a UV absorber;
wherein the ratio of the absorbed intensity of said UV absorber in said composition to the absorbed intensity of said photoinitiator in said composition at a wavelength in the range from 370 nm-400 nm is less than 7.5.

A fourth aspect relates to:
A method of making an optical fiber comprising:
   drawing an optical fiber from a preform;
   applying a coating composition to said optical fiber; said coating composition comprising:
      a first radiation-curable component;
      a photoinitiator; and
      a UV absorber;
   wherein the ratio of the absorbed intensity of said UV absorber in said composition to the absorbed intensity of said photoinitiator in said composition at a wavelength in the range from 360 nm-410 nm is less than 7.5; and curing said coating composition.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings are illustrative of selected aspects of the present description, and together with the specification serve to explain principles and operation of methods, products, and compositions embraced by the present description. Features shown in the drawing are illustrative of selected embodiments of the present description and are not necessarily depicted in proper scale

BRIEF DESCRIPTION OF THE DRAWINGS

While the specification concludes with claims particularly pointing out and distinctly claiming the subject matter of the written description, it is believed that the specification will be better understood from the following written description when taken in conjunction with the accompanying drawings, wherein:

The embodiments set forth in the drawings are illustrative in nature and not intended to be limiting of the scope of the detailed description or claims. Whenever possible, the same reference numeral will be used throughout the drawings to refer to the same or like feature.

DETAILED DESCRIPTION OF THE EXEMPLARY EMBODIMENTS

Figure 1:
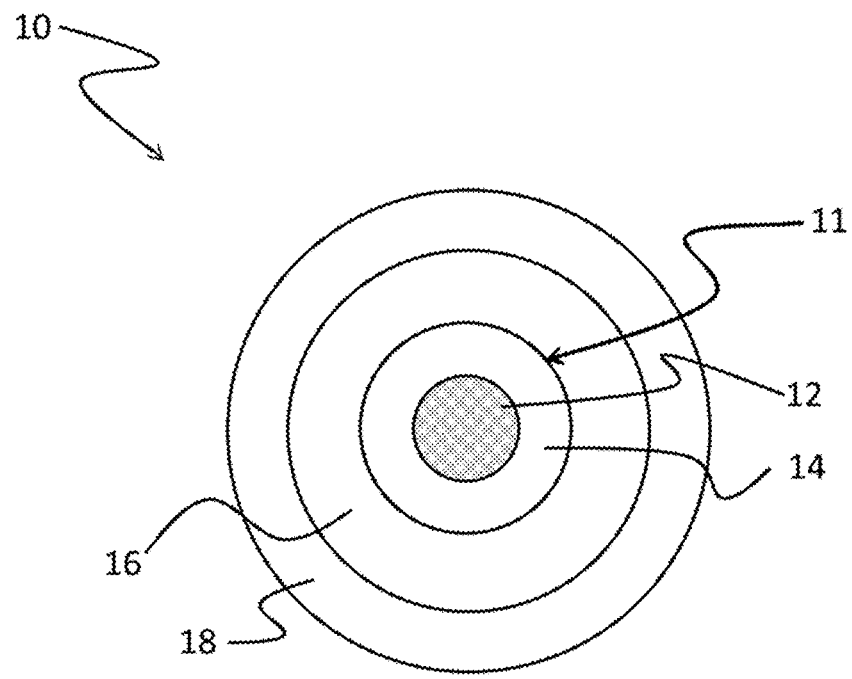
FIG. 1 is a schematic view of a coated optical fiber according one embodiment.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purpose of describing particular aspects only and is not intended to be limiting.

Disclosed are materials, compounds, compositions, and components that can be used for, can be used in conjunction with, can be used in preparation for, or are embodiments of the disclosed method and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. Thus, if a class of substituents A, B, and/or C are disclosed as well as a class of substituents D, E, and/or F, and an example of a combination embodiment, A-D is disclosed, then each is individually and collectively contemplated. Thus, in this example, each of the combinations A-E, A-F, B-D, B-E, B-F, C-D, C-E, and C-F are specifically contemplated and should be considered disclosed from disclosure of A, B, and/or C; D, E, and/or F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and/or C; D, E, and/or F; and the example combination A-D. This concept applies to all aspects of this disclosure including, but not limited to any components of the compositions and steps in methods of making and using the disclosed compositions. Thus, if there are a variety of additional steps that can be performed it is understood that each of these additional steps can be performed with any specific embodiment or combination of embodiments of the disclosed methods, and that each such combination is specifically contemplated and should be considered disclosed.

In this specification and in the claims which follow, reference will be made to a number of terms which shall be defined to have the following meanings:

Include," "includes," or like terms means encompassing but not limited to, that is, inclusive and not exclusive.

The term "about" references all terms in the range unless otherwise stated. For example, about 1, 2, or 3 is equivalent to about 1, about 2, or about 3, and further comprises from about 1-3, from about 1-2, and from about 2-3. Specific and preferred values disclosed for compositions, components, ingredients, additives, and like aspects, and ranges thereof, are for illustration only; they do not exclude other defined values or other values within defined ranges. The compositions and methods of the disclosure include those having any value or any combination of the values, specific values, more specific values, and preferred values described herein.

The indefinite article "a" or "an" and its corresponding definite article "the" as used herein means at least one, or one or more, unless specified otherwise.

The term "CAS Number" refers to a unique identification number assigned to chemical compounds by the Chemical Abstracts Service.

Reference will now be made in detail to illustrative embodiments of the present description.

The present description relates to curable optical fiber coating compositions, coatings formed from the curable coating compositions, and coated optical fibers encapsulated by the coating cured from the curable coating compositions. The present description also relates to methods of making curable coating compositions, methods of making components of curable coating compositions, and methods of coating fibers with the curable coating composition. The coatings may have low Young's modulus, high tensile strength and may be suitable as primary coatings for optical fibers. The coating composition includes a UV-absorbing additive that protects the coating from post-draw exposure to UV light. The UV-absorbing additive promotes stability of the properties of the coating by preventing extraneous UV light from influencing the degree of cure of the coating after draw. The UV-absorbing additive may be referred to herein as a UV absorber.

In the description that follows, various components of coating compositions will be discussed and the amounts of particular components in the coating composition will be specified in terms of weight percent (wt %) or parts per hundred (pph). The components of the coating composition include base components and additives. The concentration of base components will be expressed in terms of wt % and the concentration of additives will be expressed in terms of pph.

As used herein, the weight percent of a particular base component refers to the amount of the component present in the coating composition on a basis that excludes additives. The additive-free coating composition includes only base components and may be referred to herein as a base composition or base coating composition. Any crosslinker component(s), diluent component(s), non-radiation-curable reinforcing agent(s), and polymerization initiator(s) present in a coating composition are regarded individually as base components and collectively as a base composition. The base composition minimally includes a radiation-curable component and a polymerization initiator. The radiation-curable component may be a radiation-curable crosslinker or a radiation-curable diluent. The radiation-curable component may be a monomer or an oligomer. The base composition may include one or more radiation-curable crosslinker components, one or more radiation-curable diluent components, one or more non-radiation-curable reinforcing agents, and one or more polymerization initiators. The collective amount of base components in a coating composition is regarded herein as equaling 100 weight percent.

Additives are optional and may include one or more of a UV absorber, an adhesion promoter, an antioxidant, a catalyst, a carrier or surfactant, a tackifier, a stabilizer, and an optical brightener. Representative additives are described in more detail hereinbelow. The amount of additives introduced into the coating composition is expressed herein in parts per hundred (pph) relative to the base composition. For example, if 1 g of a particular additive is added to 100 g of base composition, the concentration of additive will be expressed herein as 1 pph.

One embodiment relates to a coated optical fiber. An example of a coated optical fiber is shown in schematic cross-sectional view in FIG. 1. Coated optical fiber 10 includes a glass optical fiber 11 surrounded by primary coating 16 and secondary coating 18. The primary coating 16 is the cured product of a coating composition in accordance with the present description.

The glass fiber 11 is an uncoated optical fiber including a core 12 and a cladding 14, as is familiar to the skilled artisan. In many applications, the core and cladding layer have a discernible core-cladding boundary. Alternatively, the core and cladding layer can lack a distinct boundary. One such fiber is a step-index fiber. Exemplary step-index fibers are described in U.S. Pat. Nos. 4,300,930 and 4,402,570 to Chang, each of which is hereby incorporated by reference in its entirety. Another such fiber is a graded-index fiber, which has a core whose refractive index varies with distance from the fiber center. A graded-index fiber is formed basically by diffusing the glass core and cladding layer into one another. Exemplary graded-index fibers are described in U.S. Pat. No. 5,729,645 to Garito et al., U.S. Pat. No. 4,439,008 to Joormann et al., U.S. Pat. No. 4,176,911 to Marcatili et al., and U.S. Pat. No. 4,076,380 to DiMarcello et al., each of which is hereby incorporated by reference in its entirety.

The optical fiber may also be single or multi-moded at the wavelength of interest, e.g., 1310 or 1550 nm. The optical fiber may be adapted for use as a data transmission fiber (e.g. SMF-28®, LEAF®, and METROCOR®, each of which is available from Corning Incorporated of Corning, N.Y.). Alternatively, the optical fiber may perform an amplification, dispersion compensation, or polarization maintenance function. The skilled artisan will appreciate that the coatings described herein are suitable for use with virtually any optical fiber for which protection from the environment is desired.

The primary coating 16 desirably has a higher refractive index than the cladding of the optical fiber in order to allow it to strip errant optical signals away from the optical fiber core. The primary coating should maintain adequate adhesion to the glass fiber during thermal and hydrolytic aging, yet be strippable therefrom for splicing purposes. The primary coating typically has a thickness in the range of 25-40 µm (e.g. about 32.5 µm). Primary coatings are typically applied to the glass fiber as a liquid and cured, as will be described in more detail herein below.

The present primary coatings may be the cured product of a coating composition that includes a curable crosslinker, a curable diluent, and a polymerization initiator. A non-radiation-curable reinforcing agent may also be present. The coating composition may include one or more curable crosslinkers, one or more curable diluents, one or more non-radiation-curable reinforcing agents, and/or one or more polymerization initiators. In one embodiment, the curable crosslinker is essentially free of urethane and urea functional groups. In another embodiment, the non-radiation curable reinforcing agent includes (thio)urethane and/or (thio)urea groups.

As used herein, the term "curable" is intended to mean that the component, when exposed to a suitable source of curing energy, includes one or more curable functional groups capable of forming covalent bonds that participate in linking the component to itself or to other components to form a cured product. The cured product is a polymer and may be employed as a polymeric coating material on an optical fiber. The curing process may be induced by radiation or by thermal energy. A radiation-curable component is a component that can be induced to undergo a curing reaction when exposed to radiation of a suitable wavelength at a suitable intensity for a sufficient period of time. The radiation curing reaction may occur in the presence of a photoinitiator. A radiation-curable component may also optionally be thermally curable. Similarly, a thermally-curable component is a component that can be induced to undergo a curing reaction when exposed to thermal energy of sufficient intensity for a sufficient period of time. A thermally curable component may also optionally be radiation curable.

A curable component may include one or more curable functional groups. A curable component with only one curable functional group may be referred to herein as a monofunctional curable component. A curable component having two or more curable functional groups may be referred to herein as a multifunctional curable component or a polyfunctional curable component. Multifunctional curable components include two or more functional groups capable of forming covalent bonds during the curing process and may introduce crosslinks into the polymeric network formed during the curing process. Multifunctional curable components may also be referred to herein as "crosslinkers" or "curable crosslinkers". Examples of functional groups that participate in covalent bond formation during the curing process are identified hereinafter.

As used herein, the terms "non-curable" and "non-radiation curable" refer to a compound or component of a coating composition that lacks functional groups capable of forming covalent bonds when exposed to the source of curing energy (radiation, thermal) during the curing process. The term "non-reactive" refers to a compound or component of a coating composition that does not react with other components of the coating composition under the conditions used in curing the coating composition. Non-reactive compounds or components are also non-curable.

In one embodiment, the curable crosslinker is a radiation curable component of the primary coating composition, and as such it includes two or more functional groups capable of participating in the covalent bonding or crosslinking of the crosslinker into the polymeric coating. Exemplary functional groups capable of participating in the crosslinking include α,β-unsaturated ester, amide, imide or vinyl ether groups.

In one embodiment, the curable crosslinker is essentially free of urethane or urea groups. The curable crosslinker may also be essentially free of thiourethane or thiourea groups. By "essentially free" it is preferable that less than 1 weight percent of the curable crosslinker component includes (thio)urethane or (thio)urea groups. In preferred embodiments, less than 0.5 weight percent of the total curable crosslinker component includes (thio)urethane or (thio)urea groups. In one preferred embodiment, the curable crosslinker component is entirely free of both (thio)urethane and (thio)urea groups.

When identifying certain groups, such as urethane and thiourethane groups, or urea and thiourea groups, or isocyanate or thioisocyanate groups, these groups may be generically identified herein as (thio)urethane, (thio)urea, or (thio)isocyanate or di(thio)isocyanate to indicate that the sulfur atom(s) may or may not be present in the group. Such groups may be referred to herein as (thio)groups and components containing (thio)groups may be referred to herein as (thio) components. The present embodiments extend to coating compositions that include (thio)components with sulfur atom(s) or without sulfur atom(s) in the (thio)functional group as well as compositions that include some (thio) components with sulfur atom(s) and some (thio)components without sulfur atom(s).

In certain embodiments, the curable crosslinker component includes one or more polyols that contain two or more α,β-unsaturated ester, amide, imide, or vinyl ether groups, or combinations thereof. Exemplary classes of such polyol crosslinkers include, without limitation, polyol acrylates, polyol methacrylates, polyol maleates, polyol fumarates, polyol acrylamides, polyol maleimides or polyol vinyl ethers comprising more than one acrylate, methacrylate, maleate, fumarate, acrylamide, maleimide or vinyl ether group. The polyol moiety of the curable crosslinker can be a polyether polyol, a polyester polyol, a polycarbonate polyol, or a hydrocarbon polyol.

The curable crosslinker component preferably has a molecular weight of between about 150 g/mol and about 15000 g/mol, in some embodiments more preferably between about 200 g/mol and about 9000 g/mol, in some embodiments preferably between about 1000 g/mol and about 5000 g/mol, in other embodiments preferably between about 200 g/mol and about 1000 g/mol. The curable crosslinker may further have a molecular weight in the range from 100 g/mol to 3000 g/mol, or in the range from 150 g/mol to 2500 g/mol, or in the range from 200 g/mol to 2000 g/mol, or in the range from 500 g/mol to 1500 g/mol.

The curable crosslinker component is present in the radiation curable composition in an amount of about 1 wt % to about 20 wt %, or in an amount of about 2 wt % to about 15 wt %, or in an amount of about 3 wt % to about 10 wt %.

The curable diluent is a generally lower molecular weight (e.g., about 120 to 600 g/mol) liquid monomer that is added to the formulation to control the viscosity to provide the fluidity needed to apply the coating composition with conventional liquid coating equipment. The curable diluent contains at least one functional group that allows the diluent, upon activation during curing, to link to the polymer formed during the curing process from the curable crosslinker and other curable components. Functional groups that may be present in the curable diluent include, without limitation, acrylate, methacrylate, maleate, fumarate, maleimide, vinyl ether, and acrylamide groups.

Monofunctional diluents will contain only a single reactive (curable) functional group, whereas polyfunctional diluents will contain two or more reactive (curable) functional groups. Whereas the former can link to the polymer network during curing, the latter can form crosslinks within the polymer network.

When it is desirable to utilize moisture-resistant components, the diluent component may be selected on the basis of its compatibility with moisture-resistant crosslinker(s) or component(s). Moisture-resistant crosslinker(s) and component(s) are typically non-polar and successful blending and co-polymerization with a diluent requires selection of a non-polar diluent. For satisfactory coating compatibility and moisture resistance, it is desirable in one embodiment to use a liquid acrylate monomer component comprising a predominantly saturated aliphatic mono- or di-acrylate monomer or alkoxy acrylate monomers.

Suitable polyfunctional ethylenically unsaturated monomer diluents include, without limitation, methylolpropane polyacrylates with and without alkoxylation such as ethoxylated trimethylolpropane triacrylate with the degree of ethoxylation being 3 or greater, preferably ranging from 3 to about 30 (e.g. Photomer 4149 available from IGM Resins, and SR499 available from Sartomer Company, Inc.), propoxylated trimethylolpropane triacrylate with the degree of propoxylation being 3 or greater, preferably ranging from 3 to 30 (e.g. Photomer 4072 available from IGM Resins; and SR492 and SR501 available from Sartomer Company, Inc.), and ditrimethylolpropane tetraacrylate (e.g. Photomer 4355 available from IGM Resins); alkoxylated glyceryl triacrylates such as propoxylated glyceryl triacrylate with the degree of propoxylation being 3 or greater (e.g. Photomer 4096 available from IGM Resins; and SR9020 available from Sartomer Company, Inc.); erythritol polyacrylates with and without alkoxylation, such as pentaerythritol tetraacrylate (e.g. SR295 available from Sartomer Company, Inc.), ethoxylated pentaerythritol tetraacrylate (e.g. SR494 available from Sartomer Company, Inc.), and dipentaerythritol pentaacrylate (e.g. Photomer 4399 available from IGM Resins; and SR399 available from Sartomer Company, Inc.); isocyanurate polyacrylates formed by reacting an appropriate functional isocyanurate with an acrylic acid or acryloyl chloride, such as tris-(2-hydroxyethyl)isocyanurate triacrylate (e.g. SR368 available from Sartomer Company, Inc.) and tris-(2-hydroxyethyl)isocyanurate diacrylate; alcohol polyacrylates with and without alkoxylation such as tricyclodecane dimethanol diacrylate (e.g. CD406 available from Sartomer Company, Inc.), alkoxylated hexanediol diacrylate (e.g. CD564 available from Sartomer Company, Inc.), tripropylene glycol diacrylate (e.g. SR306 available from Sartomer Company, Inc.) and ethoxylated polyethylene glycol diacrylate with a degree of ethoxylation being 2 or greater, preferably ranging from about 2 to 30; epoxy acrylates formed by adding acrylate to bisphenol A diglycidylether and the like (e.g. Photomer 3016 available from IGM Resins); and single and multi-ring cyclic aromatic or non-aromatic polyacrylates such as dicyclopentadiene diacrylate.

A multifunctional radiation-curable monomer may be present in the primary coating composition at a concentration from 0.05-15 wt %, or from 0.1-10 wt %, or from 0.5-10 wt %, or from 1-5 wt %, or from 1-10 wt %, or from 1-20 wt %, or from 1-50 wt %, or from 2-8 wt %, or from 5-40 wt %, or from 10-30 wt %, or from 20-30 wt %.

It may also be desirable to use certain amounts of monofunctional ethylenically unsaturated monomer diluents, which can be introduced to influence the degree to which the cured product absorbs water, adheres to other coating materials, or behaves under stress. Exemplary monofunctional ethylenically unsaturated monomer diluents include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate (e.g. SR440 available from Sartomer Company, Inc. and Ageflex FA8 available from CPS Chemical Co.), 2-ethylhexyl acrylate, nonyl acrylate, decyl acrylate, isodecyl acrylate (e.g. SR395 available from Sartomer Company, Inc.; and Ageflex FA10 available from CPS Chemical Co.), undecyl acrylate, dodecyl acrylate, tridecyl acrylate (e.g. SR489 available from Sartomer Company, Inc.), lauryl acrylate (e.g. SR335 available from Sartomer Company, Inc., Ageflex FA12 available from CPS Chemical Co. (Old Bridge, N.J.), and Photomer 4812 available from IGM Resins), octadecyl acrylate, and stearyl acrylate (e.g. SR257 available from Sartomer Company, Inc.); aminoalkyl acrylates such as dimethylaminoethyl acrylate, diethylaminoethyl acrylate, and 7-amino-3,7-dimethyloctyl acrylate; alkoxyalkyl acrylates such as butoxylethyl acrylate, phenoxyethyl acrylate (e.g. SR339 available from Sartomer Company, Inc., Ageflex PEA available from CPS Chemical Co., and Photomer 4035 available from IGM Resins), phenoxyglycidyl acrylate (e.g. CN131 available from Sartomer Company, Inc.), lauryloxyglycidyl acrylate (e.g. CN130 available from Sartomer Company, Inc.), and ethoxyethoxyethyl acrylate (e.g. SR256 available from Sartomer Company, Inc.); single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (e.g. SR423 and SR506 available from Sartomer Company, Inc., and Ageflex IBOA available from CPS Chemical Co.), tetrahydrofurfuryl acrylate (e.g. SR285 available from Sartomer Company, Inc.), caprolactone acrylate (e.g. SR495 available from Sartomer Company, Inc.; and Tone M100 available from Union Carbide Company, Danbury, Conn.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g. Photomer 4003 available from IGM Resins; and SR504 available from Sartomer Company, Inc.) and propoxylatednonylphenol acrylate (e.g. Photomer 4960 available from IGM Resins); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam (both available from Ashland Inc., Covington, Ky.); and acid esters such as maleic acid ester and fumaric acid ester.

The curable monomer diluent can include a single diluent component, or combinations of two or more monomer diluent components. The curable monomer diluent(s) is(are collectively) typically present in the primary coating composition in amounts of about 10 wt % to about 60 wt %, more preferably between about 20 wt % to about 50 wt %, and most preferably between about 25 wt % to about 45 wt %.

The radiation-curable component of the primary coating composition may include an N-vinyl amide such as an N-vinyl lactam, or N-vinyl pyrrolidinone, or N-vinyl caprolactam. The N-vinyl amide monomer may be present in the radiation-curable composition at a concentration from 0.1 wt %-40 wt %, or from 2 wt %-10 wt %.

The primary coating composition may include one or more monofunctional (meth)acrylate monomers in an amount from 5 wt %-95 wt %, or from 0 wt %-75 wt %, or from 40 wt %-65 wt %. The primary coating composition may include one or more monofunctional aliphatic epoxy (meth)acrylate monomers in an amount from 5 wt %-40 wt %, or from 10 wt %-30 wt %.

A monofunctional radiation-curable monomer may be present in the primary coating composition at a concentration from 10 wt %-60 wt %, or from 10 wt %-30 wt %, or from 30 wt %-60 wt %, or from 40 wt %-80 wt %, or from 60 wt %-80 wt %. The radiation-curable coating composition may include one or more monofunctional (meth)acrylate monomers in an amount from 5 wt %-95 wt %, or from 0 wt %-75 wt %, or from 40 wt %-65 wt %. The radiation-curable coating composition may include one or more monofunctional aliphatic epoxy (meth)acrylate monomers in an amount from 5 wt %-40 wt %, or from 10 wt %-30 wt %.

The total monomer content of the primary coating composition may be in the range from 5 wt %-95 wt %, or in the range from 20 wt %-95 wt %, or in the range from 40 wt %-95 wt %, or in the range from 60 wt %-95 wt %, or in the range from 40 wt %-85 wt %, or in the range from 60 wt %-85 wt %, or in the range from 30 wt %-75 wt %, or in the range from 40 wt % and 65 wt %.

The radiation-curable component may include a radiation-curable monofunctional or multifunctional oligomer. The oligomer may be a (meth)acrylate-terminated oligomer. The oligomer may include polyether acrylates (e.g., GENOMER 3456, available from Rahn USA (Aurora, Ill.)), polyester acrylates (e.g., EBECRYL 80, 584 and 657, available from Cytec Industries Inc. (Woodland Park, N.J.)), or polyol acrylates. The oligomer may be a di(meth)acrylate, tri(meth) acrylate, tetra(meth)acrylate, or higher (meth)acrylate. Polyol (meth)acrylates may include polyalkoxy(meth)acrylates or polyol(meth)acrylates. Examples include polyethylene glycol diacrylate and polypropylene glycol diacrylate. The monofunctional or multifunctional oligomer may lack urethane groups, urea groups, isocyanate groups, and/or hydrogen-donor groups.

In certain embodiments, the radiation-curable oligomer may include one or more polyols that contain two or more α,β-unsaturated ester, amide, imide, or vinyl ether groups, or combinations thereof. Exemplary classes of these polyol-containing oligomers include, without limitation, polyol acrylates, polyol methacrylates, polyol maleates, polyol fumarates, polyol acrylamides, polyol maleimides or polyol vinyl ethers comprising more than one acrylate, methacrylate, maleate, fumarate, acrylamide, maleimide or vinyl ether group. The polyol moiety can be a polyether polyol, a polyester polyol, a polycarbonate polyol, or a hydrocarbon polyol.

The total radiation-curable oligomer content of the primary coating composition may be less than 20 wt %, or less than 15 wt %, or less than 10 wt %, or less than 5 wt %, or less than 3 wt %, or between about 0.5 wt % and about 25 wt %, or between about 1 wt % and about 15 wt %, or between about 2 wt % and about 10 wt %. In one embodiment, the primary coating composition is free of radiation-curable oligomers.

The optional reinforcing agent is non-reactive, non-radiation curable and improves the strength of cured coatings when included as a component in a radiation-curable coating composition. The reinforcing agent may include (thio)urethane and/or (thio)urea groups to promote hydrogen bonding with the cured polymer network formed from other components of the coating compositions and have a sufficient number or molecular length of block unit(s) to promote physical entanglements with the cured polymer network formed from other components of the coating composition. The reinforcing agent may be a monomer or an oligomer.

Although the reinforcing agent lacks radiation-curable functional groups and does not covalently bond to the polymeric network formed from the curable components of the primary coating composition to form chemical crosslinks, the reinforcing agent strengthens the polymeric network through hydrogen bonding interactions and/or physical crosslinks. The hydrogen bonding interactions and/or physical crosslinks occur between the reinforcing agent and polymer chains formed by curing curable components of the primary coating composition. The reinforcing agent includes hydrogen bonding groups that participate in hydrogen bonding interactions with hydrogen bonding groups present in the cured components of the primary coating composition.

In one embodiment, the reinforcing agent includes hydrogen donor groups and interacts with hydrogen acceptor groups of the polymeric network of the primary coating. Representative hydrogen donor groups include (thio)urethane and (thio)urea groups. Physical crosslinks correspond to physical entanglements of the reinforcing agent with the polymer network formed from the curable components of the composition. The reinforcing agent may physically surround or spatially overlap multiple polymer chains of the network, or multiple sections of a single network polymer chain, to strengthen the network by creating steric or other physical barriers to motion, slippage, or scission of network polymer chains. The reinforcing agent may include hydrogen donor groups and hydrogen acceptor groups and may also hydrogen bond or otherwise interact with itself.

In one embodiment, the molecular structure of the reinforcing agent includes hard block segments and soft block segments. As used herein, segment refers to a molecular sequence within the molecular structure of the reinforcing agent that includes one or more block units. If a particular block unit occurs two or more times within a segment, it may be referred to herein as a repeat unit or a block unit. In the reinforcing agent, the hard block segments differ from the soft block segments in chemical identity of the block unit.

In descriptive terms, hard block segments are regions of relative structural rigidity in the molecular structure of the reinforcing agent and soft block segments are regions of relative structural flexibility in the molecular structure of the reinforcing agent. Structural rigidity may be viewed in terms of the glass transition temperature ($T_g$) of homopolymers or copolymers formed from the block unit(s) of the hard and soft block segments. As is known in the art, polymers at temperatures below the glass transition temperature are structurally rigid and mechanically hard. Polymers at temperatures above the glass transition temperature are structurally flexible and mechanically soft. From this perspective, homopolymers formed from a particular number of block units of hard block segments have a higher glass transition temperature than homopolymers formed from the same number of block units of soft block segments. In one embodiment, the number of block units in the homopolymers formed from the block units of soft block segments and hard block segments is at least 100 and the glass transition temperature of the homopolymer formed from block units of hard block segments is higher than the glass transition temperature of the homopolymer formed from block units of the soft block segment. In another embodiment, the number of block units in the homopolymers formed from the block units of soft block segments and hard block segments is at least 500 and the glass transition temperature of the homopolymer formed from block units of hard block segments is higher than the glass transition temperature of the homopolymer formed from block units of the soft block segment.

The structure of the reinforcing agent may be represented herein as:

$$(A)_n-(B)_m \qquad (I)$$

where A refers to a soft block segment, B refers to a hard block segment, the index n is the number of segments that are soft block segments, and the index m is the number of segments that are hard block segments. The indices n and m represent the molar proportions of soft and hard block segments, respectively, in the present reinforcing agents. The molar proportion of soft block segments corresponds to the ratio of the index n to the sum of the indices n and m. The molar proportion of hard block segments corresponds to the ratio of the index m to the sum of the indices n and m. A reinforcing agent, for example, with 200 soft block segments and 300 hard block segments has n=200, m=300, a molar proportion of soft block segments of 0.40, and a molar proportion of hard block segments of 0.60. In the present reinforcing agents, the molar proportion of hard block segments may be ≥0.35, ≥0.40, ≥0.45, or ≥0.50, or ≥0.55, or ≥0.60, or ≥0.65, or in the range from 0.35 to 0.75, or in the range from 0.40 to 0.70, or in the range from 0.45 to 0.65.

It is understood that the ends of the structure of the reinforcing agent may include capping groups to terminate the functionality of the block units and/or intervening groups between soft block segments and hard block segments.

Although representation (I) depicts a structure for a reinforcing agent having a continuous sequence of soft block segments linked to a continuous sequence of hard block segments with only one bond between a soft block segment and a hard block segment, it is understood that soft block segments and hard block segments can be intermixed and/or arranged in any order relative to each other. Random, alternating, and ordered arrangements of hard and soft block segments may be included in the reinforcing agent. Similarly, it is understood that the block units of each of several hard or soft block segments may be the same or different from each other. For example, the molecular structure of the reinforcing agent may correspond to the following representation (II):

$$(A)_{n1}-(B)_{m1}-(A)_{n2}-(B)_{m2}-(A)_{n3}- \qquad (II)$$

where n1, n2, n3 etc. may be the same or different and n1+n2+n3+ . . . =n and where m1, m2, m3 etc. may be the same or different and m1+m2+ . . . =m.

By way of example only, suitable configurations of soft block segments and hard block segments include, without limitation and where CAP refers to an optional capping group intended to limit reactivity of terminal functional groups present on soft block segments or hard block segments: CAP-Soft-Soft-Hard-CAP, CAP-Soft-Hard-Soft-CAP, and CAP-Hard-Soft-Soft-CAP; CAP-Soft-Soft-Soft-Hard-CAP, CAP-Soft-Soft-Hard-Soft-CAP, CAP-Soft-Hard-Soft-Soft-CAP, CAP-Hard-Soft-Soft-Soft-CAP, CAP-Hard-Soft-Hard-Soft-CAP, CAP-Hard-Soft-Soft-Hard-CAP, CAP-Soft-Hard-Soft-Hard-CAP; CAP-Soft-Soft-Soft-Soft-Hard-CAP, CAP-Soft-Soft-Soft-Hard-Soft-CAP, CAP-Soft-Soft-Hard-Soft-Soft-CAP, CAP-Soft-Hard-Soft-Soft-Soft- CAP, CAP-Hard-Soft-Soft-Soft-Soft-CAP, CAP-Soft-Soft-Hard-Soft-Hard-CAP, CAP-Soft-Hard-Soft-Hard-Soft-CAP, CAP-Soft-Hard-Soft-Soft-Hard-CAP, CAP-Hard-Soft-Hard-Soft-Soft-CAP, CAP-Hard-Soft-Soft-Hard-Soft-CAP, and CAP-Hard-Soft-Soft-Soft-Hard-CAP; CAP-Soft-Soft-Soft-Soft-Soft-Hard-CAP, CAP-Soft-Soft-Soft-Soft-Hard-Soft-CAP, CAP-Soft-Soft-Soft-Hard-Soft-Soft-CAP, CAP-Soft-Soft-Hard-Soft-Soft-Soft-CAP, CAP-Soft-Hard-Soft-Soft-Soft-CAP, CAP-Hard-Soft-Soft-Soft-Soft-Soft-CAP, CAP-Hard-Soft-Soft-Soft-Soft-Hard-CAP, CAP-Hard-Soft-Soft-Soft-Hard-Soft-CAP, CAP-Hard-Soft-Soft-Hard-Soft-Soft-CAP, CAP-Hard-Soft-Hard-Soft-Soft-Soft-CAP, CAP-Soft-Hard-Soft-Hard-Soft-Soft-CAP, CAP-Soft-Hard-Soft-Soft-Hard-Soft-CAP, CAP-Soft-Hard-Soft-Hard-Soft-CAP, CAP-Soft-Soft-Hard-Soft-Soft-Hard-CAP, CAP-Soft-Soft-Hard-Soft-Hard-Soft-CAP, and CAP-Soft-Soft-Soft-Hard-Soft-Hard-CAP; etc.

To promote strengthening of cured products of coating compositions that include the present reinforcing agents, it is desirable to include hydrogen bonding groups in the molecular structure of the reinforcing agents. The hydrogen bonding groups may be hydrogen donor groups or hydrogen acceptor groups. The reinforcing agent may include hydrogen donor groups and hydrogen acceptor groups.

In one embodiment, the block unit(s) of the soft block segments includes (thio)urethane and/or (thio)urea groups. In another embodiment, the block unit(s) of the hard block segments include (thio)urethane and/or thio(urea) groups. In still another embodiment, the block unit(s) of the soft block segments include (thio)urethane and/or (thio)urea groups and the block unit(s) of the hard block segments include (thio)urethane and/or thio(urea) groups. (Thio)urethane groups include —N—H groups that can function as hydrogen donors as well as carbonyl groups that can function has hydrogen acceptors. (Thio)urea groups include —N—H groups that can function has hydrogen donors.

In one embodiment, block unit(s) of the soft block segments and/or hard block segments include urethane groups formed from a reaction of an alcohol compound and an isocyanate compound. The alcohol compound may be a multifunctional alcohol compound that includes two or more alcohol groups (diol, triol, etc.). The isocyanate compound may be a multifunctional isocyanate compound that includes two or more isocyanate groups. Thiourethane groups may be similarly formed from reactions of alcohol compounds and thioisocyanate compounds.

Representative diisocyanate compounds that are suitable as reactants for forming soft block and hard block segments in the present reinforcing agents are shown in Table 1 below. The list of compounds presented in Table 1 is intended to be representative, but not limiting, of the linking groups that may be used in diisocyanate (or multifunctional isocyanate) compounds. In the depictions of Table 1, the squiggly lines show the positions of the isocyanate groups in diisocyanate embodiments. In toluene diisocyanate (TDI), the methyl group defines the 1-position of the aromatic ring, one isocyanate group is fixed at the 2-position of the aromatic ring, and the second isocyanate group may be positioned at any of the 3-, 4-, 5- or 6-positions. In the case of alkyl diisocyanates, isocyanate groups are positioned at the two terminal positions of the alkylene linking group. The corresponding dithioisocyanate or multifunctional thioisocyanate compounds may also be used.

TABLE I

Isocyanate Compounds and Linking Groups

| Isocyanate Compound | Linking Group |
|---|---|
| 4,4'-methylene bis(cyclohexyl) diisocyanate (H12MDI) | |
| toluene diisocyanate (TDI) | |
| Isophorone diisocyanate (IPDI) | |
| Tetramethyl-1,3-xylylene diisocyanate (XDI) | |
| 4,4'-methylene bis(phenyl) diisocyanate (MDI) | |
| p-phenylene diisocyanate (PDI) | |
| Alkyl diisocyanates | —(CH$_2$)$_q$— where q is 2 to 12, preferably 6 |

Representative alcohols that may be reacted with (thio)isocyanate compounds to form soft block segments and hard block segments of the present reinforcing agents include polyether polyols such as poly(propylene glycol)[PPG], poly(ethylene glycol)[PEG], poly(tetramethylene glycol)[PTMG] and poly(1,2-butylene glycol) and co-polyether polyols of these; polycarbonate polyols, polyester polyols and hydrocarbon polyols (such as hydrogenated poly(butadiene) polyols), amine-capped derivative of these and combinations thereof. For many optical fiber coating applications, polyether polyols are preferred, with PPG being most preferred. It is preferred to use a non-crystallizing polyol such as PPG. The number average molecular weight of the polyol may be greater than 250 g/mol, or greater than 400 g/mol, or greater than 1000 g/mol, or greater than 2000 g/mol, or greater than 4000 g/mol, or in the range from about 250 g/mol to about 9000 g/mol, or in the range from about 500 g/mol to about 7000 g/mol, or in the range from about 750 g/mol to about 5000 g/mol, or in the range from about 1000 g/mol to about 4000 g/mol.

In one embodiment, the reinforcing agent is the product of a reaction of a polyol, a diisocyanate, and a diol. The polyol may be polyethylene glycol or polypropylene glycol, the diisocyanate may be H12MDI or MDI, and the diol may be an alkane diol with terminal diol groups and six or fewer carbon atoms. In one embodiment, the polyol is polypropylene glycol, the diisocyanate is H12MDI, and the diol is butanediol.

In a further embodiment, the reinforcing agent is a non-reactive branched (thio)urethane or (thio)urea component and may be referred to herein as a NRBU or NRBU component. The NRBU component lacks radiation curable groups, but includes (thio)urethane and/or (thio)urea groups.

The reinforcing agent may contain a core moiety covalently linked to two or more block moieties that comprise (thio)urethane and/or (thio)urea groups, and terminate in a non-radiation curable capping agent. The capping agent may also be referred to herein as a capping moiety or capping group. The block moieties may also be referred to herein as branches. Each of the block moieties contains one or more soft blocks and optionally one or more hard blocks, wherein the average weight ratio of the soft blocks to hard blocks is at least 3:1. The soft blocks are the reaction products of a di(thio)isocyanate and a polyol or amine-capped polyol, whereas the hard blocks are the reaction products of a di(thio)isocyanate and a diol or diamine comprising a hydrocarbon or oxygen-containing hydrocarbon having an average molecular weight of between about 28 to about 400 g/mol.

The core moiety may be covalently linked to two block moieties, in which case the reinforcing agent may have a linear structure as illustrated below:

The core moiety may be covalently linked top block moieties, where p is a number greater than 2, in which case the reinforcing agent is said to have a branched structure as illustrated below:

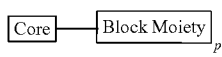

Within each of the block moieties, the number and orientation of the soft blocks and any hard blocks, if present, may not be controlled precisely. Therefore, in the structures shown below, it is intended that the structures represent an average structure of the reinforcing agents. Individual molecules within a single formulation may differ in the number and location of the different soft and hard blocks within the component relative to the average structure.

By way of example only, suitable configurations of soft and hard blocks include, without limitation: -Soft-Soft-Hard-CAP, -Soft-Hard-Soft-CAP, and -Hard-Soft-Soft-CAP for block moieties containing three blocks and capped with a non-reactive capping moiety (CAP); -Soft-Soft-Soft-Hard-CAP, -Soft-Soft-Hard-Soft-CAP, -Soft-Hard-Soft-Soft-CAP, -Hard-Soft-Soft-Soft-CAP, -Hard-Soft-Hard-Soft-CAP, -Hard-Soft-Soft-Hard-CAP, -Soft-Hard-Soft-Hard-CAP for block moieties containing four blocks and capped with a non-reactive capping moiety (CAP); -Soft-Soft-Soft-Soft-Hard-CAP, -Soft-Soft-Soft-Hard-Soft-CAP, -Soft-Soft-Hard-Soft-Soft-CAP, -Soft-Hard-Soft-Soft-Soft-CAP, -Hard-Soft-Soft-Soft-Soft-CAP, -Soft-Soft-Hard-Soft-Hard-CAP, -Soft-Hard-Soft-Hard-Soft-CAP, -Soft-Hard-Soft-Hard-CAP, -Hard-Hard-Soft-Soft-CAP, -Hard-Soft-Soft-Hard-Soft-CAP, and -Hard-Soft-Soft-Soft-Hard-CAP for block moieties containing five blocks and capped with a non-reactive capping moiety (CAP); -Soft-Soft-Soft-Soft-Soft-Hard-CAP, -Soft-Soft-Soft-Soft-Hard-Soft-CAP, -Soft-Soft-Soft-Hard-Soft-Soft-CAP, -Soft-Soft-Hard-Soft-Soft-CAP, -Soft- Hard-Soft-Soft-Soft-Soft-CAP, -Hard-Soft-Soft-Soft-Soft-Soft-CAP, -Hard-Soft-Soft-Soft-Soft-CAP, -Hard-Soft-Soft-Soft-Hard-Soft-CAP, -Hard-Soft-Soft-Hard-Soft-Soft-CAP, -Hard-Soft-Hard-Soft-Soft-Soft-CAP, -Soft-Hard-Soft-Soft-Soft-Hard-CAP, -Soft-Hard-Soft-Soft-Hard-Soft-CAP, -Soft-Hard-Soft-Hard-Soft-CAP, -Soft-Soft-Hard-Soft-Soft-Hard-CAP, -Soft-Soft-Hard-Soft-Hard-Soft-CAP, and -Soft-Soft-Soft-Hard-Soft-Hard-CAP for block moieties containing six blocks and capped with a non-reactive capping moiety (CAP); etc.

In one embodiment, the reinforcing agents have the average structure according to formulae (Ia) or (Ib) shown below:

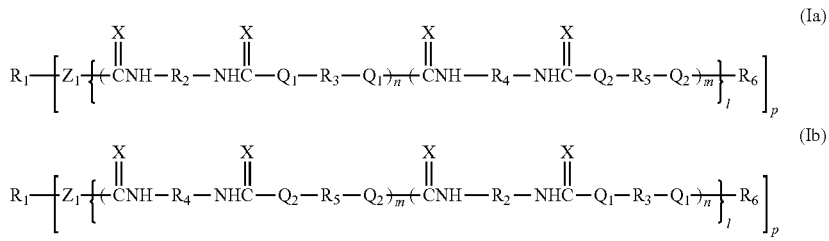

wherein,
$R_1$ is a core moiety of a multifunctional reactant, where the number of functional groups of the core moiety is defined by p, where p is 2 or greater; each X is independently S or O;
$Z_1$ is —O—, —S—, —N(H)—, or —N(alkyl)-, preferably —O— or —N(H)—;
each of $Q_1$ and $Q_2$ is independently —O—, —S—, —N(H)—, or —N(alkyl)-, preferably —O— or —N(H)—;
each of $R_2$ and $R_4$ is a core moiety of a di(thio)isocyanate reactant;
$R_3$ is a core moiety of a polyol or amine-capped polyol reactant;
$R_5$ is a hydrocarbon or oxygen-containing hydrocarbon having an average molecular weight of between about 28 to about 400;

$R_6$ is represented by the structure according to formula (II) or (III)

$$\begin{array}{c} X \\ \| \\ -CNH-R_7-NHC-Z_2-R_8 \end{array} \quad \text{or} \quad \text{(II)}$$

$$\begin{array}{c} X \\ \| \\ -CNH-R_9 \end{array} \quad \text{(III)}$$

where X is defined as above, $Z_2$ is —O—, —S—, —N(H)—, or —N(alkyl)-, preferably —O— or —N(H)—, $R_7$ is a core moiety of a di(thio)isocyanate reactant, $R_8$ is a non-radiation curable capping agent, and $R_9$ is a core moiety of an isocyanate or thioisocyanate reactant;
l is 1 to 6;
m is greater than or equal to 0, preferably 1 to 4, more preferably 1 to 3; and
n is greater than or equal to 1, preferably 2 to 10, more preferably 2 to 6.

In the structures of formulae (Ia) and (Ib), the block moiety is the region within square brackets defined by variable p; a soft block is the region within round brackets defined by variable n or the moiety defined as formula (II); and the hard block is the region within round brackets defined by variable m.

The core moiety ($R_1$) present in the reinforcing agent is the reaction product of a multifunctional core reactant. The functional groups can be hydroxyl groups or amino groups. Preferably, the multifunctional core reactant is a polyol or an amine-capped polyol. Examples of these core reactants and their number of functional groups (p) include, without limitation, glycerol, where p=3; trimethylol propane, where p=3; pentaerythritol, where p=4; ditrimethylol propane, where p=4; ethylenediamine tetrol, where p=4; xylitol, where p=5; dipentaerythritol, where p=6; sucrose and other disaccharides, where p=8; alkoxylated derivatives thereof; dendrimers where p is from about 8 to about 32, such as poly(amidoamine) (PAMAM) dendrimers with G1 (p=8), G2 (p=16), or G3 (p=32) amine groups or PAMAM-OH dendrimers with G1 (p=8), G2 (p=16), or G3 (p=32) hydroxyl groups; and combinations thereof.

$R_2$, $R_4$, and $R_7$ independently represent the core moiety of a di(thio)isocyanate reactant. This includes both diisocyanates and dithioisocyanates, although diisocyanates are preferred. Although any diisocyanates and dithioisocyanates can be used, preferred $R_2$, $R_4$, and $R_7$ core groups of these diisocyanates and dithioisocyanates include the following:

| Reactant Name | $R_2$ or $R_4$ or $R_7$ Core Moiety |
|---|---|
| 4,4'-methylene bis(cyclohexyl) diisocyanate (H12MDI) | |
| toluene diisocyanate (TDI) | |
| Isophorone diisocyanate (IPDI) | |
| Tetramethyl-1,3-xylylene diisocyanate (XDI) | |
| 4,4'-methylene bis(phenyl) diisocyanate (MDI) | |
| p-phenylene diisocyanate (PDI) | |
| Alkyl diisocyanates | —(CH$_2$)$_q$— where q is 2 to 12, preferably 6 |

$R_3$ is a core moiety of a polyol or amine-capped polyol reactant that preferably has a number average molecular weight of greater than or equal to about 400. In certain embodiments, the polyol or amine-capped polyol has a number average molecular weight between about 1000 and about 9000, between about 2000 and 9000, or between about 4000 and 9000. Examples of suitable $R_3$-forming polyols include, without limitation, polyether polyols such as poly(propylene glycol)[PPG], poly(ethylene glycol)[PEG], poly(tetramethylene glycol) [PTMG] and poly(1,2-butylene glycol); polycarbonate polyols; polyester polyols; hydrocarbon polyols such as hydrogenated poly(butadiene) polyols; amine-capped derivatives of these polyols, and any combinations thereof.

$R_5$ is a hydrocarbon or oxygen-containing hydrocarbon, which is preferably saturated, and has an average molecular weight of between about 28 to about 400. Thus, $R_5$ is the core moiety of a low molecular weight diol (to form urethane linkages) or diamine (to form urea linkages) reactant that acts analogously to a chain extender in a polyurethane. Exemplary reactants include, without limitation, 1,4-butanediol, 1,6-hexanediol, ethylene diamine, 1,4-butanediamine, and 1,6-hexanediamine. As noted above, these chain extender based urethane or urea groups are expected to result in "hard block" areas along the block moiety branch(es) that promote more effective hydrogen bonding branch interactions than would the simple urethane (or urea) linkages resulting from polyol (or amine capped polyol)/isocyanate links. Where m is 0, the hard block is not present.

$R_8$ is the reaction product of a non-radiation curable capping agent, which caps the reactive isocyanate group at the end of a block moiety branch. These agents are preferably monofunctional alcohols (or amines) that will react with residual isocyanate groups at the end of a branch.

Examples of these reactants include, without limitation, 1-butanol, 1-octanol, poly(propylene glycol) monobutyl ether, and 2-butoxyethanol.

$R_9$ is a core moiety of an (thio)isocyanate reactant. Any suitable monofunctional (thio)isocyanate can be used for this purpose. Exemplary (thio)isocyanate reactants that can serve as non-reactive capping agent for an arm of the component include, without limitation, methyl isocyanate, ethyl isocyanate, n-propyl isocyanate, i-propyl isocyanate, n-butyl isocyanate, i-butyl isocyanate, n-pentyl isocyanate, n-hexyl isocyanate, n-undecylisocyanate, chloromethyl isocyanate, β-chloroethyl isocyanate, γ-chloropropyl isocyanate, ethoxycarbonylmethyl isocyanate, β-ethoxyethyl isocyanate, α-ethoxyethyl isocyanate, α-butoxyethyl isocyanate, α-phenoxyethylisocyanate, cyclopentyl isocyanate, cyclohexyl isocyanate, methyl isothiocyanate, and ethyl isothiocyanate.

In certain embodiments of the reinforcing agents, each branch or block moiety preferably has a molecular weight of at least about 1000, preferably at least about 2000, more preferably at least about 3000. In certain embodiments, each branch has a molecular weight of about 3000 to about 15000 daltons, more preferably between about 3000 and about 12000 daltons. Consequently, the reinforcing agent preferably has a molecular weight of between about 4000 and about 50000 daltons, more preferably between about 6000 and about 35000 daltons, even more preferably between about 8000 and about 25000 daltons. In one embodiment, the length and/or molecular weight of the branches are selected to promote physical entanglements of the reinforcing agent with the cured network formed from the curable cross-linker and/or curable diluent. Larger branches are expected to participate in more or stronger physical interactions with the cured network and the stronger physical interactions are expected to impart strength to the cured coating. If the molecular weight of the branches is too large, however, the reinforcing agent may be difficult to process.

The degree of intra- and inter-component interactions through hydrogen bonding can be adjusted by varying the molecular weight of the polyol or amine-capped polyol used to form part of a branch or block moiety. For example, one could use a single soft block with a molecular weight of about 8000 or multiple (n) soft blocks having a lower molecular weight but collectively having about the same overall molecular weight. In this example, the latter soft block will have more urethane/urea linkages and would be expected to hydrogen bond more effectively. As noted above, these interactions can also be promoted by the inclusion of optional chain extender based hard blocks. The number of urethane/urea linkages and the numbers of soft and hard blocks can be adjusted through the number of n and m blocks as well as the n1 m ratio. As will be appreciated by one of ordinary skill in the art, while these hydrogen bonding interactions demonstrate expected increases in cured coating integrity and performance, strong intra-component interactions also may in some circumstances limit the solubility of the component in a coating formulation or lead to physical gelation of an component during synthesis or after it has been mixed into a formulation but before radiation-induced curing has occurred.

The reinforcing agent can be prepared using standard reactions between isocyanate groups and hydroxyl (alcohol) groups (to form urethane linkages) or amine groups (to form urea linkages) that are well known to those skilled in the art. By way of example, molar measures of the desired reactants can be mixed together in a reaction vessel, with stirring, and maintained at a suitable temperature of about 45° C. to about 80° C., preferably about 70° C., for a duration suitable to allow each step of the reaction to complete. Typically, 30 to 90 minutes is sufficient in this regard depending upon the reaction temperature. The identity and quantity of materials used and the order of addition required to prepare a reinforcing having a given structure would be known to one skilled in the art. In order to facilitate handling of the reinforcing agents during synthesis, especially those with high viscosity, one or more of the radiation curable diluents used in the final formulation, such as, for example, Sartomer SR504 (ethoxylated (4) nonyl phenol acrylate), Miramer M166 (ethoxylated (4) nonyl phenol acrylate) or IBOA (isobornyl acrylate), can be used as a diluent during the synthesis of the reinforcing agent.

Once synthesis of the reinforcing agent is complete, it can be combined with radiation-curable compounds and other components to formulate a coating composition in accordance with the present description. The reinforcing agent is present in the coating composition in an amount of at least 1 wt %, or at least 5 wt %, or at least 10 wt %, or at least 20 wt %, or in the range from 1 wt %-50 wt %, or in the range from 2 wt %-40 wt %, or in the range from 5 wt % to 35 wt %, or in the range from 10 wt % to 30 wt %, or in the range from 10 wt % to about 20 wt %.

In certain embodiments, the primary coating composition includes about 1 wt % to about 20 wt % of one or more curable crosslinkers, about 10 wt % to about 60 wt % percent of one or more curable diluents, and about 15 wt % to about 40 wt % of one or more of the present reinforcing agents. In a variation of this embodiment, each of the one or more curable crosslinkers may have a number average molecular weight less than 2000 g/mol, or less than 1000 g/mol, or less than 500 g/mol and/or the number average molecular weight of the reinforcing agent may be less than about 30000 g/mol, or less than 25000 g/mol, or less than 20000 g/mol, or less than 15000 g/mol.

In another embodiment, the primary coating composition includes about 2 wt % to about 15 wt % of one or more curable crosslinkers, about 4 wt % to about 50 wt % of one or more curable diluents, and about 15 wt % to about 40 wt % of one or more of the present reinforcing agents. In a variation of this embodiment, each of the one or more curable crosslinkers may have a number average molecular weight less than 2000 g/mol, or less than 1000 g/mol, or less than 500 g/mol and/or the number average molecular weight of the reinforcing agent may be less than about 30000 g/mol, or less than 25000 g/mol, or less than 20000 g/mol, or less than 15000 g/mol.

In another embodiment, the primary coating composition includes about 3 wt % to 10 wt % of one or more curable crosslinkers, about 25 wt % to about 50 wt % of one or more curable diluents, and about 15 wt % to about 40 wt % of one or more of the present reinforcing agents. In a variation of this embodiment, each of the one or more curable crosslinkers may have a number average molecular weight less than 2000 g/mol, or less than 1000 g/mol, or less than 500 g/mol and/or the number average molecular weight of the reinforcing agent may be less than about 30000 g/mol, or less than 25000 g/mol, or less than 20000 g/mol, or less than 15000 g/mol.

In a further embodiment, the primary coating composition includes about 1 wt % to about 20 wt % of one or more curable crosslinkers, about 60 wt % to about 85 wt % of one or more curable diluents, and about 5 wt % to about 25 wt % of one or more of the present reinforcing agents. In a variation of this embodiment, each of the one or more curable crosslinkers may have a number average molecular weight less than 2000 g/mol, or less than 1000 g/mol, or less than 500 g/mol and/or the number average molecular weight of the reinforcing agent may be less than about 30000 g/mol, or less than 25000 g/mol, or less than 20000 g/mol, or less than 15000 g/mol.

In other embodiments, the primary coating composition includes one or more monofunctional monomers, one or more bifunctional monomers, and a reinforcing agent. The one or more monofunctional monomers may be present in this embodiment of the primary coating composition in an amount of at least 30 wt %, or at least 40 wt %, or at least 50 wt %, or at least 60 wt %, or at least 70 wt %, or in the range from 40 wt %-90 wt %, or in the range from 50 wt %-85 wt %, or in the range from 55 wt %-80 wt %. The one or more bifunctional monomers may be present in this embodiment of the primary coating composition in an amount of less than 25 wt %, or less than 20 wt %, or less than 15 wt %, or less than 10 wt %, or in the range from 1 wt %-30 wt %, or in the range from 3 wt %-25 wt %, or in the range from 5 wt %-20 wt %, or in the range from 7 wt %-15 wt %. The reinforcing agent may be present in this embodiment of the primary coating composition in an amount in the range from 1 wt %-30 wt %, or in the range from 3 wt %-25 wt %, or in the range from 5 wt %-20 wt %, or in the range from 7 wt %-17 wt %.

The base primary coating composition includes a polymerization initiator. The polymerization initiator is a reagent that is suitable to cause polymerization (i.e., curing) of the composition after its application to a glass fiber. Polymerization initiators suitable for use in the primary coating compositions include thermal initiators, chemical initiators, electron beam initiators, and photoinitiators. Photoinitiators are the preferred polymerization initiators. For most acrylate-based coating formulations, conventional photoinitiators, such as the known ketonic photoinitiators and/or phosphine oxide photoinitiators, are preferred. Photoinitiators are reactive components and undergo reaction, rearrangement, or decomposition to provide chemical species (e.g. free radicals) capable of initiating a photoreaction with a curable component of the coating composition. When used in the present coating compositions, the photoinitiator is present in an amount sufficient to provide rapid ultraviolet curing. The coating composition may include one or more photoinitiators. The concentration of photoinitiator(s) may be between about 0.25 wt % to about 10.0 wt %, or between about 0.5 wt % and 7.5 wt %, or between about 0.75 wt % and 5.0 wt %.

The photoinitiator, when used in a small but effective amount to promote radiation cure, should provide reasonable cure speed without causing premature gelation of the coating composition. A desirable cure speed is any speed sufficient to cause substantial curing of the coating materials.

Suitable photoinitiators include, without limitation, 1-hydroxycyclohexyl-phenyl ketone (e.g. Irgacure 184 available from BASF), (2,6-dimethoxybenzoyl)-2,4,4-trimethylpentyl phosphine oxide (e.g. commercial blends Irgacure 1800, 1850, and 1700 available from BASF), 2,2-dimethoxyl-2-phenyl acetophenone (e.g. Irgacure 651, available from BASF), bis(2,4,6-trimethyl benzoyl)phenyl-phosphine oxide (e.g. Irgacure 819, available from BASF), (2,4,6-trimethylbenzoyl)diphenyl phosphine oxide (e.g. Lucirin TPO available from BASF, Munich, Germany), ethoxy(2,4,6-trimethylbenzoyl)phenyl phosphine oxide (e.g. Lucirin TPO-L from BASF), and combinations thereof.

In addition to the base components (curable crosslinker, curable diluent, reinforcing agent, and polymerization initiator), the present primary coating compositions may also include one or more additives. The one or more additives include a UV absorber. The one or more additives optionally include an adhesion promoter, an antioxidant, a catalyst, a carrier or surfactant, a tackifier, a stabilizer, or an optical brightener. Some additives (e.g., catalysts, reactive surfactants, and optical brighteners) may operate to control the polymerization process and may thereby affect the physical properties (e.g., modulus, glass transition temperature) of the cured product formed from the coating composition. Other additives may influence the integrity of the cured product of the coating composition (e.g., protection against UV-induced curing or oxidative degradation).

A UV absorber is an additive that absorbs one or more wavelengths in the UV portion of the spectrum. The UV absorber is non-reactive and incapable of initiating a photoreaction. The absorption spectrum of the UV absorber may include sharp features corresponding to absorption at discrete wavelengths or a narrow continuous range of wavelengths or broad features corresponding to continuous absorption over a wide range of wavelengths. As used herein, continuous absorption refers to absorption at each wavelength in the range. The UV absorber may absorb over a continuous set of wavelength that extends over at least 5 nm, or at least 10 nm, or at least 25 nm, or at least 50 nm, or at least 75 nm, or at least 100 nm, or the range from 5 nm-150 nm, or the range from 10 nm-125 nm, or the range from 25 nm-100 nm. The UV absorber may absorb continuously over the range from 350 nm-380 nm, or the range from 325 nm-380 nm, or the range from 300 nm-380 nm, or the range from 275 nm-380 nm.

In order to promote efficient photoinitiation of the curing reaction of the coating composition, it is desirable for the absorbed intensity of the UV absorber to be sufficiently low relative to the absorbed intensity of the photoinitiator at the selected photoinitiation wavelength. The absorbed intensity of the UV absorber may, but need not be, less than the absorbed intensity of the photoinitiator at the selected photoinitiation wavelength. If the absorbed intensity of the UV absorber at the selected photoinitiation wavelength is too high relative to the absorbed intensity of the photoinitiator, insufficient intensity may be available to activate the photoinitiator to initiate the polymerization process. Unless otherwise specified, absorbed intensity refers to absorbed intensity in the coating composition before initiation of the curing process.

Absorbance (A) can be determined from Beer's law as $\log(I_0/I)$, where $I_0$ is a reference intensity corresponding to the intensity of transmitted light in the absence of a coating composition and I is the intensity of transmitted light in the presence of a coating composition. Transmitted intensity I can be obtained by rearranging Beer's law and can be expressed as $I=I_0/10^A$. Separate transmitted intensities can be obtained for coating compositions with and without a UV absorber. Absorbed intensity corresponds to $I_0-I$ and can be determined for coating compositions of common thickness with and without a UV absorber. Except for the presence of absence of a UV absorber, the components and concentrations thereof in the coating compositions were kept constant so that the effect of the UV absorber on absorbed intensity could be determined. The absorbed intensity of the photoinitiator can be obtained from the absorbed intensity of a coating composition without a UV absorber. The absorbed intensity of a coating composition with both a photoinitiator and a UV absorber corresponds to the combined absorbed intensity of the photoinitiator and UV absorber. The absorbed intensity of the UV absorber can be determined by subtracting the contribution of the photoinitiator. The ratio of absorbed intensity of the UV absorber to the absorbed intensity of the photoinitiator can thus be obtained.

The ratio of the absorbed intensity of the UV absorber at the selected photoinitiation wavelength to the absorbed intensity of the photoinitiator at the selected photoinitiation wavelength may be less than 10.0, or less than 7.5, or less than 5.0, or less than 4.0, or less than 3.0, or less than 2.0, or less than 1.0, or less than 0.5, where the selected photoinitiation wavelength may be greater than 360 nm, or greater than 370 nm, or greater than 380 nm, or greater than 390 nm, or greater than 400 nm, or in the range from 360 nm-410 nm, or in the range from 370 nm-405 nm, or in the range from 375 nm-400 nm, or in the range from 380 nm-395 nm, or in the range from 385 nm-410 nm, or in the range from 390 nm-410 nm, or in the range from 395 nm-410 nm. In one embodiment, the photoinitiator absorbs at the selected photoinitiation wavelength and the UV absorber has essentially no absorption at the selected photoinitiation wavelength.

In certain embodiments, it is further desirable for the UV absorber to exhibit high absorbed intensity at wavelengths that do not interfere with efficient photoexcitation of the photoinitiator at the selected photoinitiation wavelengths described hereinabove. The photoinitiator may have broad absorption features that extend to shorter wavelengths than the selected photoinitiation wavelength. The UV absorber may be selected to have absorption bands that overlap such absorption features of the photoinitiator without significantly overlapping longer wavelength absorption features of the photoinitiator that may be used to excite the photoinitiator. It is desirable for the UV absorber to absorb wavelengths outside the selected photoinitiation wavelength to prevent unintended post-draw cure of the coating induced by wavelengths absorbed by the photoinitiator that are not preferred for exciting the photoinitiator.

In certain embodiments, the selected photoinitiation wavelength is as described hereinabove and it is desired to select a UV absorber with absorption features designed to minimize unintended curing of the coating with wavelengths less than the selected photoinitiation wavelength by insuring that the UV absorber absorbs an adequate amount of light having wavelengths less than the selected photoinitiation wavelength. Absorption of such wavelengths by the UV absorbers filters the light by reducing the intensity available for unintended excitation of the photoinitiator. Filtered wavelengths correspond to wavelengths capable of exciting the photoinitiator that are not selected to initiate photoexcitation. In one embodiment, filtered wavelengths are wavelengths not emitted by the light source used to initiate curing of the coating composition.

For any of the absorbed intensity ratios of UV absorber to photoinitiator at any of the selected photoinitiation wavelengths disclosed hereinabove, the following further embodiments are within the scope of the present specification: The ratio of the absorbed intensity of the UV absorber to the absorbed intensity of the photoinitiator over a range of filtered wavelengths extending from 10 nm below the selected photoinitiation wavelength to 30 nm below the selected photoinitiation wavelength may be greater than 0.20, or greater than 0.30, or greater than 0.40, or greater than 0.50, or greater than 0.60, or greater than 0.70, or greater than 0.80; or the ratio of the absorbed intensity of the UV absorber to the absorbed intensity of the photoinitiator over a range of filtered wavelengths extending from 10 nm below the selected photoinitiation wavelength to 350 nm may be greater than 0.20, or greater than 0.30, or greater than 0.40, or greater than 0.50, or greater than 0.60, or greater than 0.70, or greater than 0.80.

In one embodiment, the selected photoinitiation wavelength is a wavelength in the range from 395 nm-410 nm and the range of filtered wavelengths extends from 350 nm to 385 nm. In another embodiment, the selected photoinitiation wavelength is a wavelength in the range from 380 nm-410 nm and the range of filtered wavelengths extends from 350 nm to 370 nm.

UV absorbers include compounds that include moieties derived from benzophenone, benzotriazole, or substituted forms thereof. Examples include hydroxymethoxybenzophenone or substituted forms thereof, 2-hydroxyphenyl benzophenone or substituted forms thereof, 2-(2-hydroxyphenyl)-benzotriazole or substituted forms thereof, 2-hydroxyphenyl-s-triazine or substituted forms thereof, 2-hydroxy-benzophenone or substituted forms thereof, avobenzene, octocrylene, UV blockers present in sunscreens, and combinations thereof. Representative commercially available UV absorbers include Tinuvin® 1130 (CAS Numbers 104810-47-1 (38%), 104810-48-2 (50%), 25322-68-3 (12%)), Tinuvin® 171 (CAS Number 125304-04-3), Tinuvin® 400 (CAS Number 153519-44-9), Tinuvin® 460 (CAS Number 208343-47-9), Tinuvin® 479 (CAS Number 204848-45-3), Tinuvin® 900 (CAS Number 70321-86-7), Tinuvin 928(CAS Number 73936-91-1), Chimassorb® 81(CAS Number 1843-05-6), Chimassorb® 90 (CAS Number 131-57-7), and JM75A (a 2:5 mixture of avobenzene and octocrylene). Tinuvin® and Chimassorb® series UV absorbers are available from BASF.

The concentration of UV absorber in the primary coating composition may be greater than 0.1 pph, or greater than 0.25 pph, or greater than 0.50 pph, or greater than 0.75 pph, or greater than 1.0 pph, or greater than 1.5 pph, or greater than 2.0 pph, or in the range from 0.1 pph-4.0 pph, or in the range from 0.25 pph-3.0 pph, or in the range from 0.5 pph-2.5 pph.

As is well known in the art, an adhesion promoter enhances the adhesion of the primary coating to the underlying glass fiber. Any suitable adhesion promoter can be employed. Examples of a suitable adhesion promoter include, without limitation, organofunctional silanes, titanates, zirconates, and mixtures thereof. One preferred class are the poly(alkoxy)silanes. Suitable alternative adhesion promoters include, without limitation, bis(trimethoxysilylethyl)benzene, 3-mercaptopropyltrimethoxy-silane (3-MPTMS, available from United Chemical Technologies, Bristol, Pa.; also available from Gelest, Morrisville, Pa.), 3-acryloxypropyltrimethoxysilane (available from Gelest), and 3-methacryloxypropyltrimethoxysilane (available from Gelest), and bis(trimethoxysilylethyl)benzene (available from Gelest). Other suitable adhesion promoters are described in U.S. Pat. Nos. 4,921,880 and 5,188,864 to Lee et al., each of which is hereby incorporated by reference. The adhesion promoter, if present, is used in an amount between about 0.1 to about 10 pph, more preferably about 0.25 to about 3 pph.

Any suitable antioxidant can be employed. Preferred antioxidants include, without limitation, bis hindered phenolic sulfide or thiodiethylene bis(3,5-di-tert-butyl)-4-hydroxyhydrocinnamate (e.g. Irganox 1035, available from BASF), 2,6-di-t-butyl-4-methylphenol (BHT) and MEHQ (monomethyl ether hydroquinone). The antioxidant, if present, is used in an amount between about 0.1 to about 3 pph, more preferably about 0.25 to about 2 pph.

An exemplary catalyst is a tin catalyst, such as dibutyltin dilaurate, which is used to catalyze the formation of urethane bonds in some non-radiation curable components. Whether the catalyst remains as an additive of the non-radiation curable component or additional quantities of the catalyst are introduced into the composition, the presence of the catalyst may act to stabilize the non-radiation curable component(s) in the composition. Any tendency of excess tin catalyst to destabilize the silane adhesion promoter can be counteracted by addition of tetrathiol.

Suitable carriers, more specifically carriers which function as reactive surfactants, include polyalkoxypolysiloxanes. Exemplary preferred carriers are available from Goldschmidt Chemical Co. (Hopewell, Va.) under the tradename TEGORAD 2200 and TEGORAD 2700 (acrylated siloxane). These reactive surfactants may be present in a preferred amount between about 0.01 pph to about 5 pph, more preferably about 0.25 pph to about 3 pph. Other classes of suitable carriers are polyols and non-reactive surfactants. Examples of suitable polyols and non-reactive surfactants include, without limitation, the polyol Acclaim 3201 (poly(ethylene oxide-co-propylene oxide)) available from Bayer (Newtown Square, Pa.), and the non-reactive surfactant Tegoglide 435 (polyalkoxy-polysiloxane) available from Goldschmidt Chemical Co. The polyol or non-reactive surfactants may be present in a preferred amount between about 0.01 pph to about 10 pph, more preferably about 0.05 pph to about 5 pph, most preferably about 0.1 pph to about 2.5 pph.

Suitable carriers may also be ambiphilic molecules. An ambiphilic molecule is a molecule that has both hydrophilic and hydrophobic segments. The hydrophobic segment may alternatively be described as a lipophilic (fat/oil loving) segment. A tackifier is an example of one such ambiphilic molecule. A tackifier is a molecule that can modify the time-sensitive rheological property of a polymer product. In general a tackifier additive will make a polymer product act stiffer at higher strain rates or shear rates and will make the polymer product softer at low strain rates or shear rates. A tackifier is an additive that is commonly used in the adhesives industry, and is known to enhance the ability of a coating to create a bond with an object that the coating is applied upon. One preferred tackifier is Uni-tac® R-40 (hereinafter "R-40") available from International Paper Co., Purchase, N.Y. R-40 is a tall oil rosin, which contains a polyether segment, and is from the chemical family of abietic esters. A suitable alternative tackifier is the Escorez series of hydrocarbon tackifiers available from Exxon. For additional information regarding Escorez tackifiers, see U.S. Pat. No. 5,242,963 to Mao, which is hereby incorporated by reference in its entirety. The aforementioned carriers may also be used in combination. Preferably, the tackifier is present in the composition in an amount between about 0.01 pph to about 10 pph, more preferably in the amount between about 0.05 pph to about 5 pph.

Any suitable stabilizer can be employed. One preferred stabilizer is a tetrafunctional thiol, e.g., pentaerythritol tetrakis(3-mercaptopropionate) from Sigma-Aldrich (St. Louis, Mo.). The stabilizer, if present, is used in an amount between about 0.01 pph to about 1 pph, more preferably about 0.01 pph to about 0.2 pph.

Any suitable optical brightener can be employed. Exemplary optical brighteners include, without limitation, Uvitex OB, a 2,5-thiophenediylbis(5-tert-butyl-1,3-benzoxazole) (BASF); Blankophor KLA, available from Bayer; bisbenzoxazole compounds; phenylcoumarin compounds; and bis(styryl)biphenyl compounds. The optical brightener is desirably present in the composition at a concentration of about 0.003 pph to about 0.5 pph, more preferably about 0.005 pph to about 0.3 pph.

The primary coating preferably has a Young's modulus less than 1 MPa, or less than 0.75 MPa, or less than 0.50 MPa, or less than 0.35 MPa.

Representative primary coating compositions with UV absorbers are described in the Examples presented hereinbelow.

The secondary coating 26 of the optical fiber shown in FIG. 1 is typically the polymerization product of a coating composition that contains urethane acrylate liquids whose molecules become highly crosslinked when polymerized. The Young's modulus of the secondary coating is reported herein for secondary coating compositions configured as cured rods according to the following description: Rods were prepared by injecting samples of the curable secondary composition into Teflon® tubing having an inner diameter of about 0.022". The samples were cured using a Fusion D bulb at a dose of about 2.4 J/cm$^2$ (measured over a wavelength range of 225-424 nm by a Light Bug model IL390 from International Light). After curing, the Teflon® tubing was stripped away. The cured rods were allowed to condition overnight at 23° C. and 50% relative humidity. After curing the rod diameter was about 0.022". Properties such as Young's modulus, tensile strength, and % elongation at break for the cured rods formed from the secondary composition were measured using a tensile testing instrument (e.g., a Sintech MTS Tensile Tester, or an Instron Universal Material Test System) on the cured secondary rod samples. The gauge length of the testing instrument was 51 mm, and the test speed was 250 mm/min. Properties were determined as an average of five samples, with outlying data points and obviously defective rod samples being excluded from the average.

The secondary coating 26 has a Young's modulus, when configured as a cured rod having a diameter of about 0.022" of at least about 1200 MPa, or at least about 1300 MPa, or at least about 1400 MPa, or at least about 1500 MPa, or at least about 1600 MPa, or at least about 1700 MPa, or at least about 1800 MPa. The cured polymeric material of secondary coating 26, when configured as a cured rod having a diameter of about 0.022", has an elongation to break of at least about 30%, preferably at least about 40%. The cured polymeric material of secondary coating 26, when configured as a cured rod having a diameter of about 0.022", has an average tensile strength of at least about 45 MPa, more preferably at least about 50 or 55 MPa, most preferably at least about 60 MPa. The $T_g$ of the secondary coating, when configured as a cured rod having a diameter of about 0.022", is preferably between about 50° C. and about 120° C., more preferably between about 50° C. and about 100° C. The secondary coating 26 typically has a thickness of about 20 μm to about 35 μm, preferably about 25 μm to about 27 μm.

Other suitable materials for use in secondary coatings, as well as considerations related to selection of these materials, are well known in the art and are described in U.S. Pat. Nos. 4,962,992; 5,104,433; 6,584,263; 6,611,647; and 6,775,451, each of which is hereby incorporated by reference in its entirety.

The secondary coatings are typically applied to the previously coated fiber (either with or without prior curing) and subsequently cured, as will be described in more detail herein below. Various additives that enhance one or more properties of the coating can also be present, including antioxidants, catalysts, lubricants, low molecular weight non-crosslinking resins, stabilizers, surfactants, surface agents, slip additives, waxes, micronized-polytetrafluoroethylene, etc. The secondary coating may also include an ink, as is well known in the art.

Another aspect of the exemplary embodiments relates to a method of making an optical fiber including the primary coating described herein. This method can generally be performed by standard methods with the use of a composition in accordance with the present description. Briefly, the process involves fabricating the glass fiber (using methods familiar to the skilled artisan), applying a primary coating composition to the glass fiber, polymerizing (curing) the primary coating composition to form the primary coating material, applying a secondary coating composition to the primary coating composition, and polymerizing (curing) the curable secondary composition to form the secondary coating of the optical fiber. This is known as a "wet-on-dry" process since the primary coating composition is cured to form a solid coating before the liquid secondary coating composition is applied. Optionally, the secondary coating composition can be applied to the fiber after application of the primary coating composition and before curing the primary coating composition. In this process, which is known as a "wet-on-wet" process, only a single polymerization (curing) step is employed to form solid coatings from the primary and secondary coating compositions.

The primary and secondary coating compositions are coated on a glass fiber using conventional processes, for example, on a draw tower. It is well known to draw glass fibers from a specially prepared, cylindrical preform which has been locally and symmetrically heated to a temperature, e.g., of about 2000° C. As the preform is heated, such as by feeding the preform into and through a furnace, a glass fiber is drawn from the molten material. One or more coating compositions are applied to the glass fiber after it has been drawn from the preform, preferably immediately after cooling. The coating compositions are then cured to produce the coated optical fiber. The method of curing can be thermal, chemical, or radiation induced, such as by exposing the applied (uncured) coating composition on the glass fiber to ultraviolet light, actinic radiation, microwave radiation, or electron beam, depending upon the nature of the coating composition(s) and polymerization initiator employed. One method of applying dual layers of coating compositions to a moving glass fiber is disclosed in U.S. Pat. No. 4,474,830 to Taylor, which is hereby incorporated by reference in its entirety. Another method for applying dual layers of coating compositions onto a glass fiber is disclosed in U.S. Pat. No. 4,581,165 to Rannell et al., which is hereby incorporated by reference in its entirety.

Figure 2:
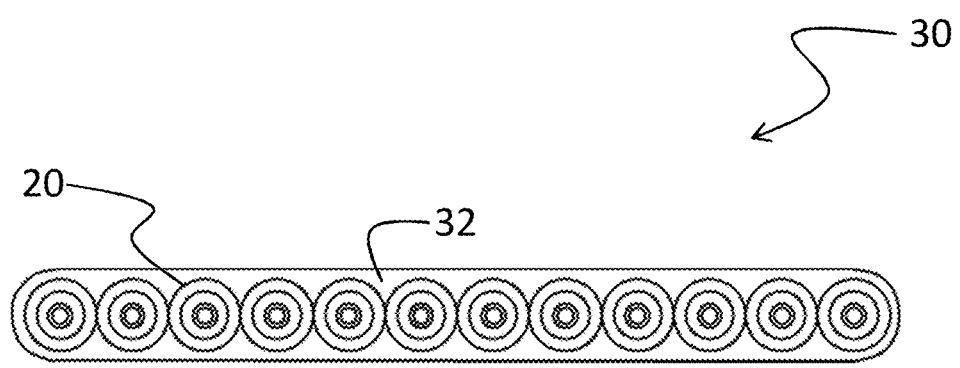
FIG. 2 is a schematic view of a representative optical fiber ribbon. The representative optical fiber ribbon includes twelve coated optical fibers.

Referring now to FIG. 2, another aspect of the exemplary embodiments relates to an optical fiber ribbon 30. The ribbon 30 includes a plurality of optical fibers 20 and a matrix 32 encapsulating the plurality of optical fibers. Optical fibers 20 include a core glass region, a cladding glass region, a primary coating in accordance with the present disclosure, and a secondary coating. The optical fibers 20 are substantially aligned relative to one another in a substantially planar relationship. It is desirable that optical fibers 20 are not displaced from a common plane by a distance of more than about one-half the diameter thereof. By "substantially aligned", it is intended that the optical fibers 20 are generally parallel with other optical fibers along the length of the fiber optic ribbon 30. The optical fibers in fiber optic ribbons may be encapsulated by the matrix 32 in any known configuration (e.g., edge-bonded ribbon, thin-encapsulated ribbon, thick-encapsulated ribbon, or multi-layer ribbon) by conventional methods of making fiber optic ribbons. In FIG. 2, the fiber optic ribbon 30 contains twelve (12) optical fibers 20; however, it should be apparent to those skilled in the art that any number of optical fibers 20 (e.g., two or more) may be employed to form fiber optic ribbon 30 disposed for a particular use.

The matrix 32 can be any suitable secondary coating composition, such those as described above. The matrix 32 can be formed from the same composition used to prepare the secondary coating 26, or the matrix 32 can be formed from a different composition that is otherwise compatible for use. The skilled artisan will appreciate that the optical fibers 20 may include a dual-layer coating system (for example, the primary and secondary coatings described hereinabove), and may be colored with a marking ink.

The fiber optic ribbon 30 may be prepared by conventional methods using an optical fiber containing a primary coating of the type described herein. For example, upon alignment of a plurality of substantially planar optical fibers having primary coatings in accordance with the exemplary embodiments described herein, the matrix composition can be applied and cured according to the methods of preparing optical fiber ribbons as described in U.S. Pat. No. 4,752,112 to Mayr and U.S. Pat. No. 5,486,378 to Oestreich et al., which are hereby incorporated by reference in their entirety.

EXAMPLES

The following Examples are intended to illustrate exemplary embodiments and are not intended to be limiting.

Table 2 shows formulations for two primary coating compositions: P1300 and P1309. Composition P1309 includes a UV absorber and composition P1300 is a control composition that lacks a UV absorber.

TABLE 2

Primary Coating Compositions

| | Components | P1300 | P1309 |
|---|---|---|---|
| Base Components (wt %) | NRU | 30 | 30 |
| | SR306 | 8 | 8 |
| | SR495 | 4 | 4 |
| | IBOA | 5 | 5 |
| | M166 | 50 | 52 |
| | TPO | 3 | 1 |
| Additives (pph) | Tinuvin ® 1130 | 0 | 2 |
| | SIA0200 | 1 | 1 |
| | Pentaerythritol tetrakis-(3-mercaptopropionate) | 0.064 | 0.064 |
| | Irganox 1035 | 1 | 1 |

NRU is a 1:1 mixture (by weight) of M166 and a reinforcing agent. M166 is ethoxylated(8) nonylphenol acrylate (available from Miwon). The reinforcing agent is a non-radiation-curable urethane oligomer made from a reaction of polypropylene glycol, 4,4'-methylene bis(cyclohexyl) diisocyanate (H12MDI), and butanediol. The procedure for preparing the reinforcing agent is described below. SR306 is a bifunctional monomer (tripropyleneglycol diacrylate, available from Sartomer). SR495 is a monofunctional monomer (caprolactone acrylate, available from Sartomer). IBOA is a monofunctional monomer (isobornyl acrylate, available from Aldrich). TPO is a photoinitiator ((2,4,6-trimethylbenzoyl)diphenyl phosphine oxide, available from BASF). Tinuvin 1130 is a UV absorber from the hydroxyphenyl-benzotriazole family of compounds (available from BASF). Tinuvin 1130 is a combination of the following three compounds:

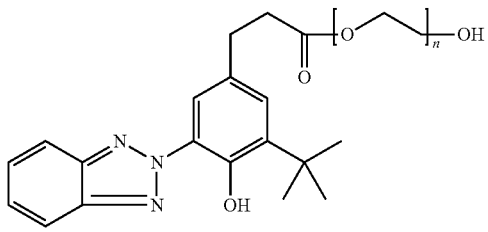

50 wt %
CAS No. 104810-48-2

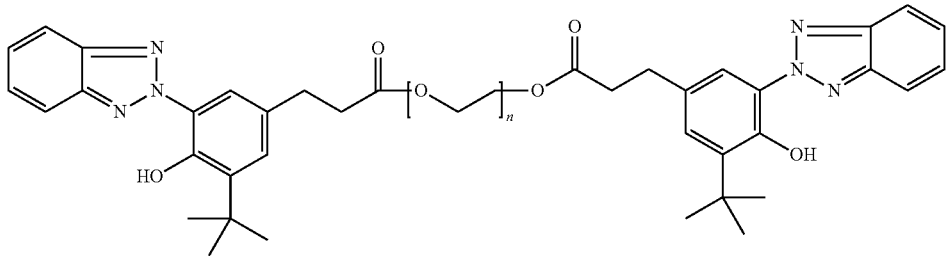 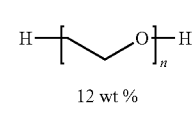

12 wt %
CAS No. 25322-68-3

38 wt %
CAS No. 104810-47-1

SIA0200 is an adhesion promoter (acryloxypropyltrimethoxysilane, available from Gelest). Pentaerythritol tetrakis(3-mercaptopropionate) is a stabilizer, available from Aldrich). Irganox 1035 is an antioxidant (thiodiethylene bis(3,5-di-tert-butyl)-4-hydroxyhydrocinnamate, available from BASF).

The reaction scheme used in the synthesis of the reinforcing agent involves a reaction of H12MDI with PPG1200 (polypropylene glycol with a number average molecular weight of 1200 g/mol) and BD (butanediol) in a 50/50 mixture with an acrylate diluent. The alcohol groups of PPG1200 and butanediol react with isocyanate groups of H12MDI to form urethane linkages. The product formed by reaction of H12MDI with PPG1200 forms a repeat unit for soft blocks, which may be represented as PPG1200-H12MDI, where it is understood that the linkage between PPG1200 and H12MDI is a urethane linkage. The product formed by reaction of H12MDI with butanediol forms a repeat unit for hard blocks, which may be represented as BD-H12MDI, where it is understood that the linkage between BD and H12MDI is a urethane linkage. The structure of the reinforcing agent can be schematically represented as:

[(PPG1200-H12MDI)$_x$~(BD-H12MDI)$_y$]$_n$ where, under the reaction conditions employed, the ratio x:y=2:3.

In an illustrative reaction, 562 g (2.14 mol) H12MDI, 1072 g (0.86 mol) PPG1200 and 115.8 g (1.28 mol) BD are reacted in the presence of 2.2 g (10 mmol) 2,6-di-t-butyl-4-methylphenol (BHT) (an antioxidant), 1.1 g (1.74 mmol) dibutyl tin dilaurate (a catalyst), and 1750 g M166 (acrylate diluent).

The circulating heater/chiller is set to a temperature $T_{set}$=15° C. To a 10 L reaction vessel, add ethoxylated (8) nonylphenol acrylate (M166) (1650 g), then add 2,6-di-t-butyl-4-methylphenol (2.2 g, 10.0 mmol), dibutyltin dilaurate (1.1 g, 1.74 mmol) and finally add H12MDI (562 g, 2.14 mol). Insert a circulating stirrer in the reaction vessel and close the vessel with a reactor top. Insulate the reactor top and then add a CaCl$_2$ drying tube, a thermocouple and an addition funnel. Connect the stirrer and stir at a rate of 100 rpm. Place PPG1200 (1072 g, 0.86 mol) in the addition funnel and slowly add PPG1200 to the stirring reaction mixture with in a continuous stream over approximately 30 min. When addition is complete, flush the addition funnel into the reactor with M166 (50 g). Set the circulating heater/chiller to a temperature $T_{set}$=95° C. and cover the reaction vessel with the insulating jacket. When the internal temperature reaches 67° C. (approx. 50 min), set the circulating heater/chiller to a temperature $T_{set}$=75° C. Stir for another 90 min. Remove the insulating jacket and set the circulating heater/chiller to a temperature $T_{set}$=45° C. Place the butanediol in the addition funnel. When the internal temperature reaches ~63° C. (approx. 20 min), start addition of the butanediol, dripping slowly, over approximately 30 min (it is recommended to not allow the internal temperature to exceed 67° C.). When addition of butanediol is complete, flush the addition funnel into the reactor with M166 (50 g). Set the circulating heater/chiller to a temperature $T_{set}$=95° C. and cover the reactor with the insulating jacket. When the internal temperature reaches 67° C. (approx. 30 min), set the circulating heater/chiller to a temperature $T_{set}$=75° C. Stir for another 120 min. Extract a sample of the reaction mixture and analyze by IR. If no residual isocyanate peak is observed, then drain the reaction mixture into a pre-weighed receiving bucket.

The primary coating compositions were applied to glass fibers in a drawing process and cured on the draw. A secondary coating was also applied and cured. The secondary coating was formed from a composition that included alkoxylated bisphenol A and epoxy diacrylate monomers. The same secondary coating was applied to each fiber.

Curing trials on the draw were conducted with various light sources to examine the effect of the UV absorber on the degree of cure of the primary and secondary coatings. The light sources included Hg lamps and LEDs. The Hg lamps were Fusion UV Model 1250 lamps (manufactured by Heraeus Noblelight Fusion UV) equipped with a D bulb (10-inch, 375 W/inch). The Hg lamp may be referred to herein as "Fusion", "Fusion lamp", or "Fusion Hg lamp". Air-cooled LED sources having peak wavelengths of 385 nm and 395 nm were used in curing of primary coating compositions P1300 and P1309. The LED sources were manufactured by Phoseon, Inc. and had peak output power of 12 W.

In the experiments that follow, a glass fiber was drawn, a primary coating composition was applied to the glass fiber and exposed to a series of curing light sources, a secondary coating composition was applied after exposure of the primary coating composition to the series of curing light sources, and the secondary coating composition was exposed to a second series of curing light sources. Depending on the experimental configuration, the primary coating composition was cured with a series of Hg lamps or a series of LED sources. The secondary coating composition was cured with a series of Hg lamps in all experiments. The light sources used to cure the primary coating composition were upstream from (i.e. closer to the draw furnace than) the light sources used to cure the secondary coating composition.

Figure 3:
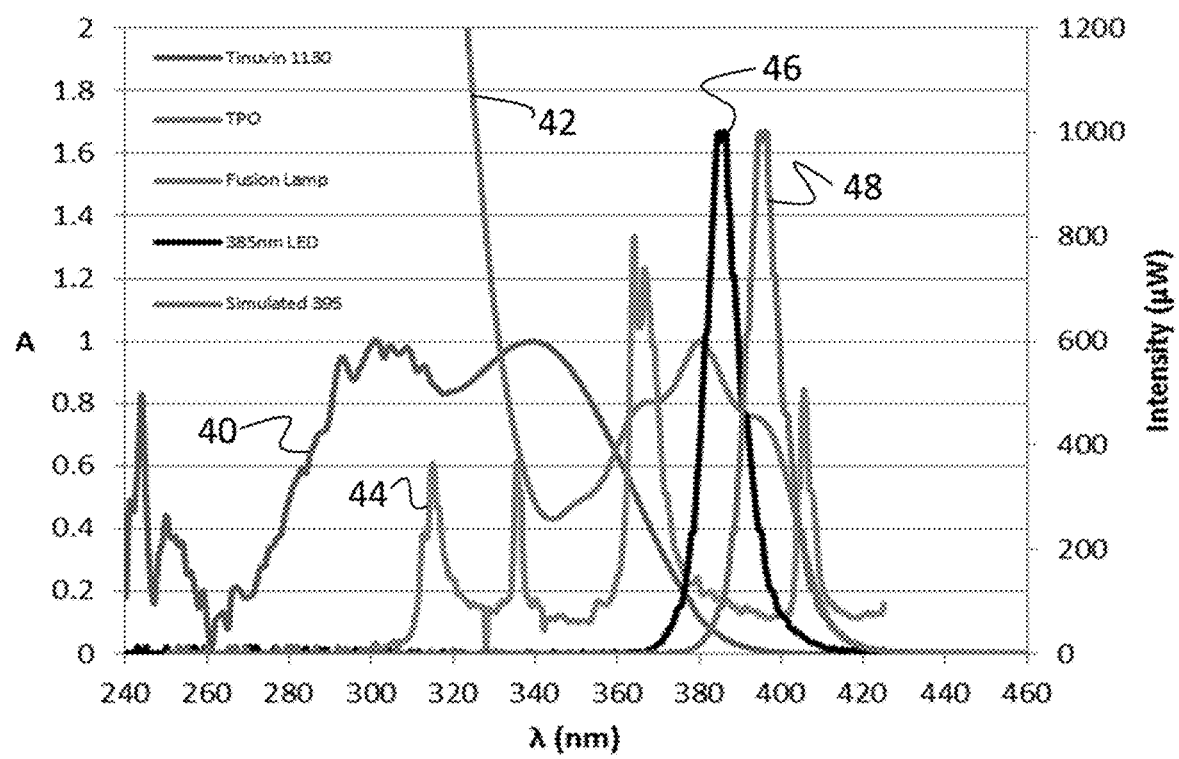
FIG. 3 depicts normalized absorption spectra of a UV absorber and a photoinitiator and the normalized spectral output intensity of a Fusion Hg lamp and LED light sources with peak emission wavelengths of 385 nm and 395 nm.

FIG. 3 illustrates normalized absorption spectra of the UV absorber (Tinuvin 1130) (trace 40) and the photoinitiator (TPO) (trace 42) along with the normalized output spectral intensity of the Fusion Hg lamp and LED sources used in the curing experiments. The output spectrum of an Hg lamp (Fusion UV Model 1250 with D bulb) is shown as trace 44, the output spectrum of the LED source with a peak emission wavelength of 385 nm is shown as trace 46, and a simulated output spectrum of the LED source with a peak emission wavelength of 395 nm is shown as trace 48. (The output spectrum of the 395 nm LED is expected to have essentially the same line shape as the 385 nm LED with a 10 nm shift in wavelength. The simulated spectrum for the 395 nm LED accordingly corresponds to the output spectrum of the 385 nm LED modified with a 10 nm shift to longer wavelength.) The absorption spectrum of the UV absorber significantly overlaps the output spectrum of the Hg lamp. The LED sources were selected to minimize spectral overlap with the UV absorber.

Experiments of curing fibers on the draw using the Fusion Hg lamp to cure the primary coating were performed and compared to results obtained using the LED sources to cure the primary coating for primary coating compositions with and without a UV absorber. Table 3 shows the average degree of cure (DoC) of the primary and secondary coatings for primary coating composition P1300. Two different draw configurations were employed to cure the primary coating composition. In the first configuration, a series of five Fusion Hg lamps was employed to cure primary coating composition P1300 and a series of five Fusion Hg lamps was employed to cure the secondary coating composition. In the second configuration, a series of five LED sources was employed to cure primary coating composition P1300 and a series of five Fusion Hg lamps was employed to cure the secondary coating composition. The five LED sources included 3 LED sources with peak emission at 385 nm and 2 LED sources with peak emission at 395 nm. The results shown in Table 3 indicate that in the absence of a UV absorber, a similar degree of curing was obtained for the primary coating composition when using either Fusion Hg lamps or LED sources. Values over 100% reflect uncertainties in baseline determination. True values are expected to be very close to 100%.

TABLE 3

Degree of Cure of P1300 Primary Coating Composition on the Draw

| Draw speed (m/s) | Primary Lamps | Secondary Lamps | Primary DoC (%) | Secondary DoC (%) |
| --- | --- | --- | --- | --- |
| 42 | 5 Fusion | 5 Fusion | 88.2 ± 0.2 | 97.1 ± 0.5 |
| 42 | 5 LED | 5 Fusion | 91.3 ± 0.4 | 100.3 ± 0.1 |

Table 4 shows the average degree of cure of primary coating composition P1309 and the secondary coating composition for different configurations of light sources at two draw speeds. At a draw speed of 30 m/s, the 4 LED sources included 1 LED source with peak emission at 385 nm and 3 LED sources with peak emission at 395 nm. At a draw speed of 42 m/s, the 5 LED sources included 2 LED sources with peak emission at 385 nm and 3 LED sources with peak emission at 395 nm.

Table 4 also includes the number of Level 1 (L1) flaws in the cured primary coating per kilometer of coated fiber. Level 1 flaws are an indicator of the number of defects in the primary coating and are detected by laser scattering. Microscopic examination of the primary coating indicated that the Level 1 flaws in the present experiments were axial abrasions that were caused by shear forces accompanying application of the secondary coating composition to the primary coating after the fiber with primary coating composition has been exposed to the series of light sources used to cure the primary coating composition. The presence of Level 1 flaws reflects an insufficient degree of cure and inferior mechanical properties of the primary coating. Primary coatings with a high level of Level 1 flaws exhibit poor resistance to damage caused by external stresses.

The results shown in Table 4 indicate that when the UV absorber is present in the primary coating composition, the primary coating formed by curing with LED light sources exhibits a higher degree of cure and fewer Level 1 flaws than the primary coating formed by curing with Fusion Hg lamps. The more efficient cure observed for LED sources is consistent with weaker absorption of the LED light by the UV absorber present in the primary coating. The less efficient cure observed for the Fusion Hg lamp is a consequence of significant absorption of the output spectrum of the Fusion Hg lamp by the UV absorber. The results indicate that by shifting the photoinitiation wavelength to wavelengths that are not absorbed or absorbed only weakly by the UV absorber, high degrees of curing of the primary coating composition can be obtained and that a primary coating that absorbs over a wide range of UV wavelengths can be achieved without sacrificing mechanical integrity.

TABLE 4

Degree of Cure of P1309 Primary Coating Composition on the Draw

| Draw speed (m/s) | Primary Lamps | Secondary Lamps | Primary DoC (%) | Secondary DoC (%) | L1 Flaws/km |
| --- | --- | --- | --- | --- | --- |
| 30 | 4 Fusion | 4 Fusion | 73.2 ± 0.6 | 99.0 ± 0.1 | 13 |
| 30 | 5 Fusion | 4 Fusion | 78.7 ± 0.6 | 97.9 ± 0.1 | 3 |
| 30 | 4 LED | 4 Fusion | 83.6 ± 0.7 | 98.6 ± 0.5 | 0.5 |
| 42 | 6 Fusion | 5 Fusion | 70.8 ± 0.6 | 97.4 ± 0.4 | 38 |
| 42 | 5 LED | 5 Fusion | 75.9 ± 1.1 | 98.1 ± 0.1 | 34 |

Table 5 illustrates the effect LED excitation wavelength on the degree of cure and Level 1 flaws of primary coating composition P1309. The data in Table 5 was obtained by using two LED sources to cure primary coating composition P1309 and 3 Fusion Hg lamps to cure the secondary coating composition during fiber draw. In some trials, the two LED sources had a peak emission wavelength of 395 nm. In other trials, the two LED sources had a peak emission wavelength of 385 nm. For each peak LED emission wavelength, trials at different draw speeds were performed. The degrees of cure of the primary and secondary coatings after exposure to the curing light sources are listed in Table 5 along with the number of Level 1 (L1) flaws in the primary coating per kilometer of coated fiber. Values over 100% reflect uncertainties in baseline determination. True values are expected to be very close to 100%.

TABLE 5

Degree of Cure and Level 1
Flaws for P1309 Primary Coating Composition

| Draw speed (m/s) | Primary Lamps | Secondary Lamps | Primary DoC (%) | Secondary DoC (%) | L1 Flaws/km |
|---|---|---|---|---|---|
| 20 | 2 LED (395 nm) | 3 Fusion | 106.2 ± 0.5 | 99.4 ± 0.1 | 5 |
| 25 | 2 LED (395 nm) | 3 Fusion | 94.4 ± 1.4 | 98.7 ± 0.4 | 52 |
| 30 | 2 LED (395 nm) | 3 Fusion | 73.6 ± 1.2 | 97.8 ± 0.3 | 57 |
| 20 | 2 LED (385 nm) | 3 Fusion | 94.2 ± 0.5 | 100.6 ± 0.7 | 1 |
| 25 | 2 LED (385 nm) | 3 Fusion | 96.2 ± 1.3 | 97.8 ± 0.3 | 25 |
| 30 | 2 LED (385 nm) | 3 Fusion | 71.5 ± 0.7 | 95.0 ± 1.3 | 66 |

The data summarized in Table 5 indicate that the degree of cure for the primary coating is higher when the primary coating composition is cured at 395 nm relative to 385 nm, while the degree of cure of the secondary coating is similar. The higher curing efficiency at 395 nm relative to 385 nm is consistent with the smaller spectral overlap of the LED with peak emission at 395 nm with the absorption spectrum of the UV absorber relative to the spectral overlap of the LED with peak emission at 385 nm with the absorption spectrum of the UV absorber. The smaller spectral overlap leads to less interference of the UV absorber with excitation of the photoinitiator when the LED having a peak emission wavelength near 395 nm is used as the light source.

An additional set of primary coating composition formulations was prepared to compare the effect of a different UV absorber on the curing properties of the primary coating. The formulations are listed in Table 6, where the components are as described hereinabove for Table 2. P1330 is a control composition that lacks a UV absorber, P1329 is a composition that includes Tinuvin® 171 as a UV absorber, and P1334 is a composition that includes JM75A as a UV absorber. Tinuvin® 171 is a UV absorber in the hydroxyphenylbenzotriazole class (2-(2H-benzotriazol-2-yl)-6-dodecyl-4-methylphenol, CAS No. 125304-04-3). JM75A is a combination of two sunscreen components, avobenzene and octocrylene, in a 2:5 ratio (by weight). Water-cooled LED sources having peak wavelengths of 385 nm and 395 nm were used in the curing of primary coating compositions P1329, P1330, and P1334. The LED sources were manufactured by Phoseon, Inc. and had peak output power of 20 W.

TABLE 6

Primary Coating Compositions

| | Components | P1330 | P1329 | P1334 |
|---|---|---|---|---|
| Base Components (wt %) | NRU | 30 | 30 | 30 |
| | SR306 | 8 | 8 | 8 |
| | SR495 | 4 | 4 | 4 |
| | IBOA | 5 | 5 | 5 |
| | M166 | 51.75 | 51.75 | 51.75 |
| | TPO | 1.25 | 1.25 | 1.25 |
| Additives (pph) | Tinuvin ® 171 | 0 | 2 | 0 |
| | JM75A | 0 | 0 | 2.5 |
| | SIA0200 | 1 | 1 | 1 |
| | Pentaerythritol tetrakis-(3-mercaptopropionate) | 0.064 | 0.064 | 0.064 |

Figure 4:
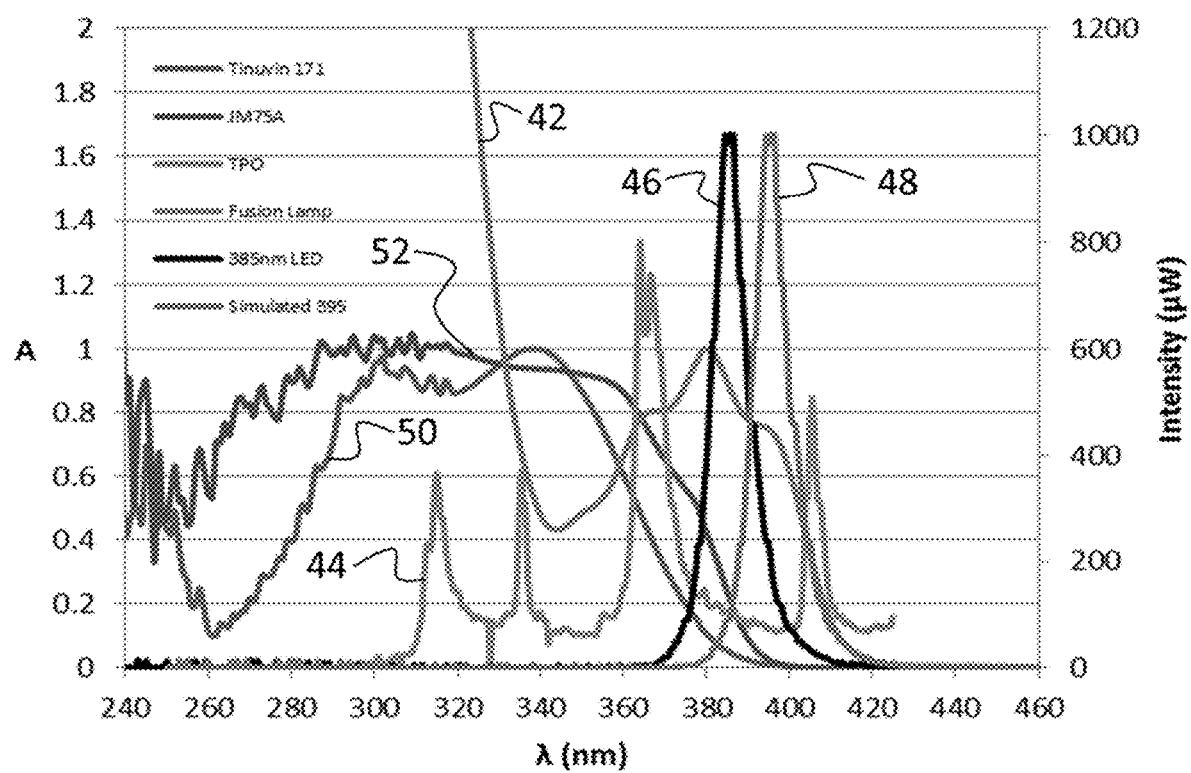
FIG. 4 depicts normalized absorption spectra of two UV absorbers and a photoinitiator and the normalized spectral output intensity of a Fusion Hg lamp and LED light sources with peak emission wavelengths of 385 nm and 395 nm.

FIG. 4 illustrates normalized absorption spectra of the UV absorbers Tinuvin 171 (trace 50) and JM75A (Trace 52). The normalized absorption spectrum of the photoinitiator (TPO) (trace 42) and the normalized output spectral intensity of the Fusion Hg lamp (trace 44), the LED source with a peak emission wavelength of 385 nm (trace 46), and the LED source with a peak emission wavelength of 395 nm (trace 48) are repeated from FIG. 3. UV absorber Tinuvin 171 has an absorption spectrum similar to Tinuvin 1130 (FIG. 3), but exhibits a larger extinction coefficient. JM75A exhibits a broader absorption band than Tinuvin 171 and exhibits greater overlap with the output spectrum of the LED sources having peak emission wavelengths at 385 nm and 395 nm.

Table 7 shows the degree of cure for primary coatings formed from the primary coating compositions P1330, P1329, and P1334. The highest degree of cure was observed for control composition P1330. A noticeable reduction in the degree of cure was observed for composition P1329 due to overlap of the absorption spectrum of the Tinuvin 171 UV absorber and the output emission of the 385 nm LED source. An even greater reduction in curing efficiency was observed for composition P1334. As seen in FIG. 4, the UV absorber JM75A exhibits higher absorption strength at 385 nm than Tinuvin 171. The competing absorption lowers the excitation efficiency of the photoinitiator and hinders the curing process. The reduced curing efficiency is reflected in Table 7 by the lower draw speed needed to obtain a degree of curing in composition P1334 that is comparable to the degree of curing observed for composition P1329. The lower draw speed promotes curing by increasing the time of exposure of the coating composition to the LED source light.

TABLE 7

Degree of Cure of P1300 Primary Coating Composition on the Draw

| Coating | Draw speed (m/s) | Primary Lamps | Secondary Lamps | Primary DoC (%) | Secondary DoC (%) |
|---|---|---|---|---|---|
| P1330 | 30 | 6 LED (385 nm) | 5 Fusion | 94.4 ± 0.5 | 99.7 ± 0.3 |
| P1329 | 30 | 6 LED (385 nm) | 5 Fusion | 84.2 ± 0.8 | 99.1 ± 0.3 |
| P1334 | 20 | 6 LED (385 nm) | 5 Fusion | 89.4 ± 0.5 | 101.1 ± 0.3 |

Table 8 compares the cure speeds of compositions P1330 and P1329 at 25° C. and 55° C. upon excitation with a Fusion Hg lamp and a 385 nm LED. Cure speeds were measured by using FTIR spectroscopy to monitor the conversion of acrylate double bonds to single bonds as a function of time. The area of the —C=C— band extending from 1396 cm$^{-1}$-1419 cm$^{-1}$ was monitored. The band had a peak intensity of about 1410 cm$^{-1}$. Cure speed measurements analyze the rate of cure of a material during UV exposure. Cure speed measurements are related to degree of cure measurements in that the disappearance of the acrylate species is measured. However, the degree of cure is a static measurement, which is performed on a finished cured product. Cure speed is a dynamic measurement that monitors the curing reaction during the curing process as the coating composition evolves to form a coating. From one perspective, the cure speed can be regarded as a series of degree of cure measurements taken over a period of time during a UV exposure. The end result of the cure speed measurement is a plot of cure vs. time.

All cure speed data were acquired using a Bruker Vertex 80 FTIR operating in Rapid Scan mode. Thin films (1 mil wet thickness) of uncured coating were drawn on an ASI DuraSamplir® equipped with a 3 mm diamond coated zinc selenide DuraDisc® and an Omega CN76000 temperature controller. The sample chamber was purged for ~30 s with house nitrogen. The sample was irradiated for 1 s using a Lesco Super Spot Mk II spot cure system (mercury) or a Lesco 385 nm LED system. Exposure time was controlled using a UniBlitz® VS25 with model T132 driver. Spectra were obtained before, during, and after the 1 second exposure at a rate of 1 scan every 35 ms. The sample was then irradiated with a 10 s exposure to complete the cure and monitored for several scans.

Percent cure values were calculated from the peak area (PA) of the acrylate band extending from 1396 cm$^{-1}$-1419 cm$^{-1}$ using the following formula:

$$\% \text{ Cure} = \frac{PA_{uncured} - PA_{sample}}{PA_{uncured} - PA_{fully\ cured}} \times 100$$

$PA_{uncured}$ corresponds to the uncured peak area before exposure to curing radiation, $PA_{fully\ cured}$ corresponds to the peak area of the fully cured state, and $PA_{sample}$ corresponds to the peak area at intermediate times between the uncured and fully cured states. The % Cure represents the time-dependent conversion of acrylate double bonds and may also be referred to herein as conversion. Conversion values were calculated independently for each spectrum acquired during the time period monitored and conversion vs. time plots were constructed.

Figure 5:
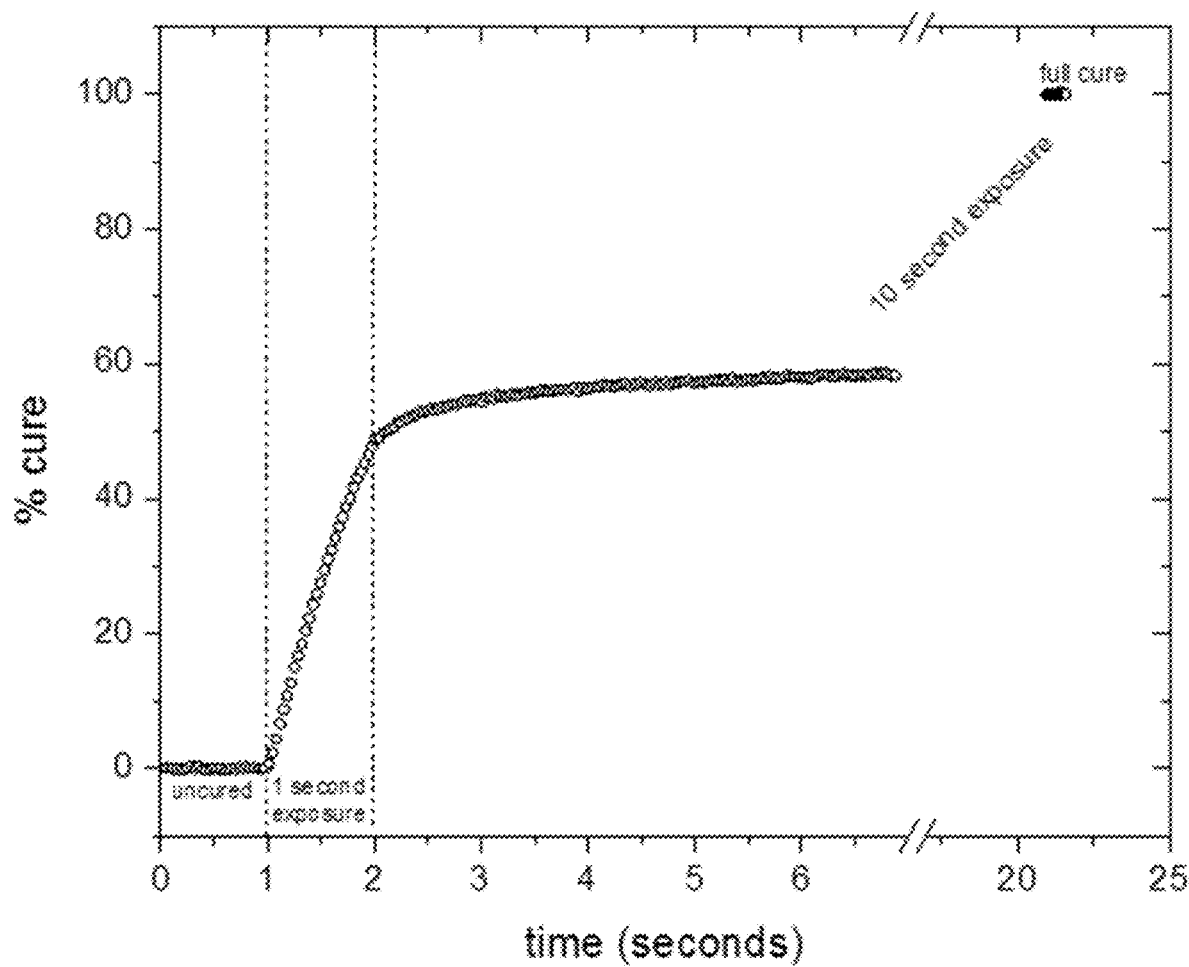
FIG. 5 depicts a schematic conversion plot used to monitor the curing reaction of a coating composition.

A schematic conversion vs. time plot is shown in FIG. 5. Conversion is reported as % Cure as defined in the equation above. In the time period between 0 sec and 1 sec, spectra of the uncured composition were acquired and the % Cure was zero. At a time of 1 sec, the curing reaction was initiated and allowed to continue for 1 sec. At a time of 2 sec, the curing source was turned off. A rapid increase in % Cure occurs upon exposure of the composition to the curing source. The curing process was monitored with the curing source turned off between 2 sec and 7 sec. The curing source was turned on between 7 sec and 17 sec to provide a 10 sec exposure period to finish the cure. No spectra were acquired during the 10 sec exposure period. After the curing source was turned off, spectra of the final state were measured beginning at a time of about 20 sec. In the illustrative example shown in FIG. 5, the % Cure after the 10 sec exposure was essentially 100%. Whether or not a fully cured state was obtained under the curing conditions described in FIG. 5 depended on the coating composition. The timing and exposure of cure described for FIG. 5 were used to obtain data for the conversion plots of the coating compositions described herein.

The cure speed data presented in Table 8 were obtained from conversion plots of the type shown in FIG. 5. Cure speed is a measure of the rate of polymerization and can be obtained from the slope of the conversion plot. As is evident from FIG. 5, the slope changes as the curing reaction proceeds. The evolution of the physical state of the system during the curing reaction influences the cure speed. In the early stages of curing, the coating composition is fluid. As curing proceeds and conversion increases, the coating composition becomes more viscous and ultimately becomes rigid as a solid coating is formed. When the coating composition becomes sufficiently viscous, the curing reaction becomes diffusion limited and cure speed is influenced by both the kinetics of the curing reaction and diffusivity of the compounds in the coating composition.

To avoid the effect of diffusion on cure speed, cure speed is defined on the basis of conversion before the curing reaction becomes diffusion limited. More specifically, cure speed is defined as the slope of the conversion plot between 10% and 40% conversion. The slope of the conversion plot between 10% and 40% conversion was observed to be nearly constant in the measurements performed to acquire the data shown in Table 8 (correlation coefficients were typically >0.99). The nearly constant slope indicates that the curing reaction is dominated by the kinetics of the curing reaction for conversions below 40% and that the reaction becomes diffusion limited at some conversion above 40%. Cure speeds reported in Table 8 were determined according to this procedure and have units of %/sec, where % refers to % Cure or conversion. The entry "N/A" in Table 8 indicates that the composition did not reach a conversion level of 40% under the conditions used to cure the composition.

The data in Table 8 indicate that the presence of the UV absorber in composition P1329 results in a significant reduction in cure speed irrespective of the choice of light source used for photoinitiation.

TABLE 8

| Cure Speed of Primary Coating Compositions P1330 and P1329 | | | | |
|---|---|---|---|---|
| | Fusion Hg | | 385 nm LED | |
| | 25° C. | 55° C. | 25° C. | 55° C. |
| P1330 | 44 | 41 | 70 | 61 |
| P1329 | N/A | N/A | 51 | 47 |

Figure 6:
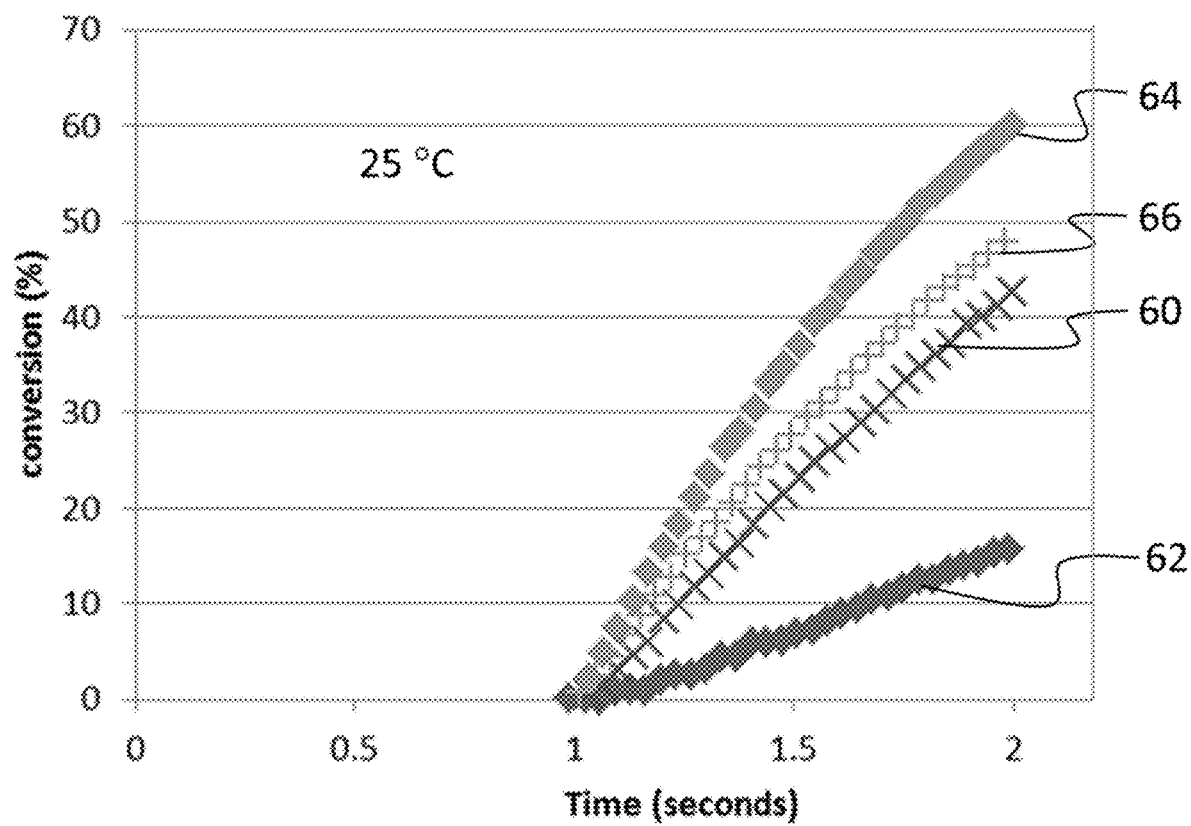
FIG. 6 shows the degree of cure of primary coating compositions P1329 and P1330 upon excitation with a Fusion Hg lamp and a 385 nm LED at 25° C.
Figure 7:
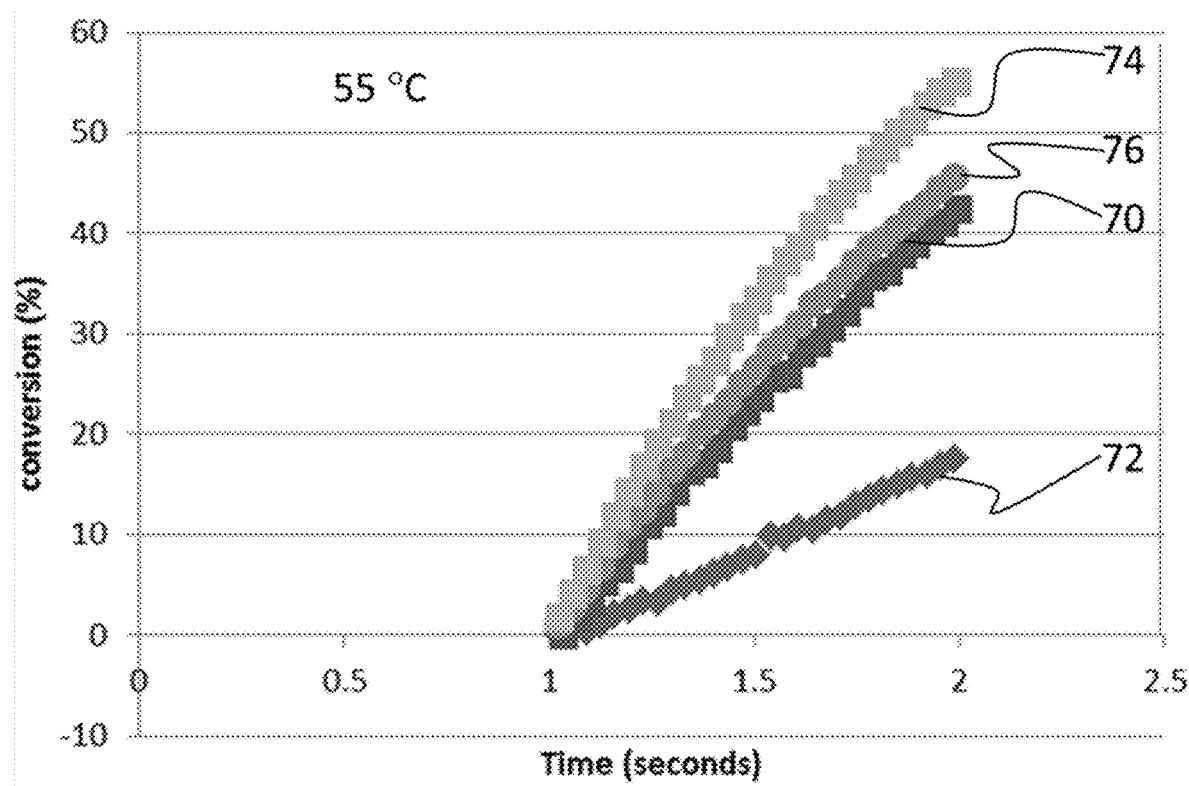
FIG. 7 shows the degree of cure of primary coating compositions P1329 and P1330 upon excitation with a Fusion Hg lamp and a 385 nm LED at 25° C.

FIGS. 6 and 7 show the conversion of acrylate double bonds as a function of time for primary coating compositions P1329 and P1330. The data in FIG. 6 was measured at 25° C. Traces 60 and 62 shows the conversion of acrylate double bonds upon excitation with a Fusion Hg lamp for compositions P1330 and P1329, respectively. Traces 64 and 66 shows the conversion of acrylate double bonds upon excitation with an LED having a peak emission wavelength of 385 nm for compositions P1330 and P1329, respectively. The data illustrate a clear reduction in the conversion of acrylate double bonds when a UV absorber is present in the composition for both excitation sources. The reduction in conversion is more pronounced when using a Fusion Hg lamp because of the stronger overlap of the absorption spectrum of the UV absorber with the spectral output of the Fusion Hg lamp relative to the spectral output of the 385 nm LED.

The data in FIG. 7 was measured at 55° C. Traces 70 and 72 shows the conversion of acrylate double bonds upon excitation with a Fusion Hg lamp for compositions P1330 and P1329, respectively. Traces 74 and 76 shows the conversion of acrylate double bonds upon excitation with an LED having a peak emission wavelength of 385 nm for compositions P1330 and P1329, respectively. The data illustrate a clear reduction in the conversion of acrylate double bonds when a UV absorber is present in the composition for both excitation sources. The reduction in conversion is more pronounced when using a Fusion Hg lamp because of the stronger overlap of the absorption spectrum of the UV absorber with the spectral output of the Fusion Hg lamp relative to the spectral output of the 385 nm LED.

Figure 8:
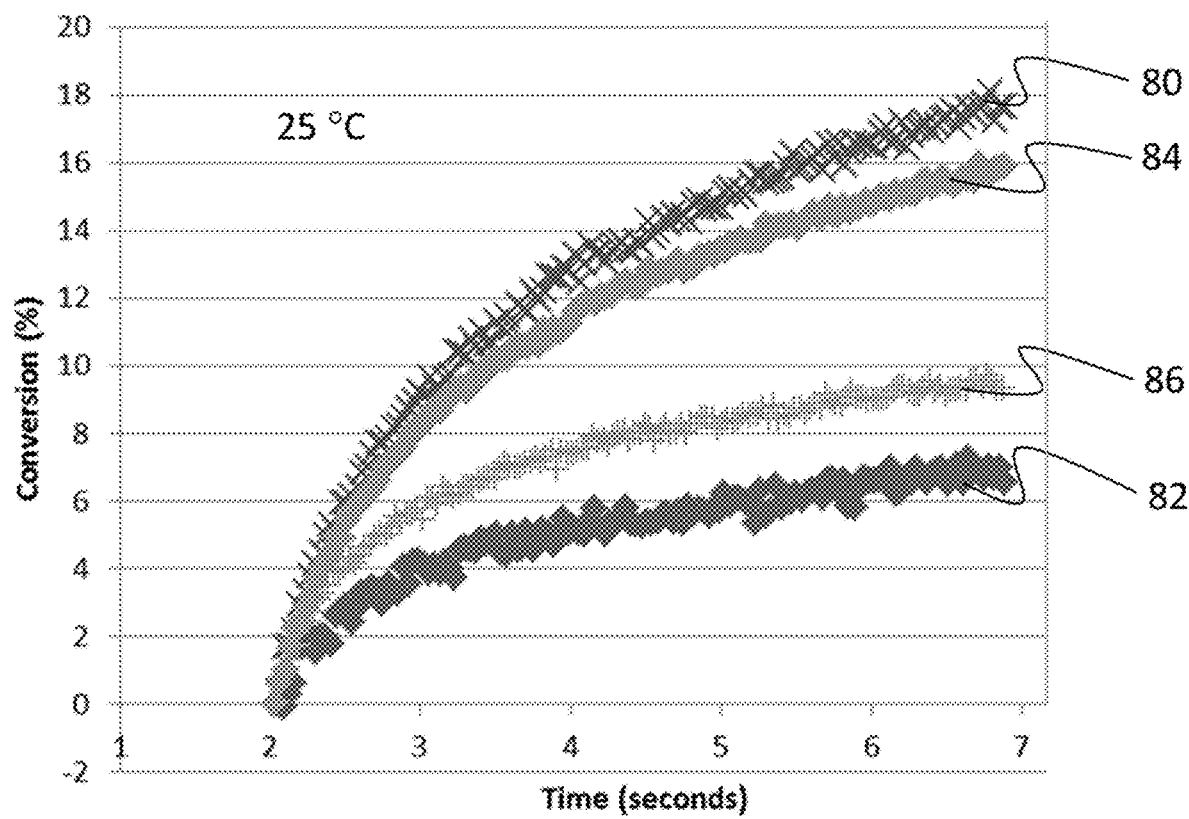
FIG. 8 shows the dark state degree of cure of of primary coating compositions P1329 and P1330 upon excitation with a Fusion Hg lamp and a 385 nm LED at 25° C.

FIG. 8 shows the dark state curing of primary coating compositions P1329 and P1330 upon excitation with a Fusion Hg lamp and a 385 nm LED at 25° C. Dark state curing refers to the continued curing that occurs in the coating composition after removal of the excitation light source. Acrylate double conversion as a function of time after termination of excitation is plotted in FIG. 8. Traces 80 and 82 shows the conversion of acrylate double bonds after termination of excitation with a Fusion Hg lamp for compositions P1330 and P1329, respectively. Traces 84 and 86 shows the conversion of acrylate double bonds after termination of excitation with an LED having a peak emission wavelength of 385 nm for compositions P1330 and P1329, respectively. The results indicate that irrespective of excitation light source, the presence of the UV absorber in the coating results in a significant reduction in dark state curing. A reduction in dark state curing is desirable because it leads to less uncertainty and variability in the degree of cure of the coating. A closer correlation of the degree of cure with time of exposure to the light source is achieved when including a UV absorber in the coating composition.

A calculation was performed to determine the amount of energy available to excite the photoinitiator from various light sources. The energy available to excite the photoinitiator depends on the spectral intensity and wavelength distribution from the light source, the absorption spectrum of the photoinitiator, and absorption of source light by a UV absorber. Absorption by the UV absorber reduces the spectral intensity available for exciting the photoinitiator. The purpose of the calculation was to determine the net energy available for exciting the photoinitiator by considering the spectral overlap of the light source with the absorption spectrum of the photoinitiator, the spectral overlap of the light source with a UV absorber, the spectral overlap of the UV absorber with the photoinitiator, and the relative absorption strengths (extinction coefficients) of the UV absorber and photoinitiator.

In the calculation, TPO was selected as the photoinitiator and Tinuvin 1130 was selected as the UV absorber. Various light sources were considered: Fusion Hg lamp and LED sources having peak emission wavelengths of 385 nm, 395 nm, and 405 nm. The LED sources had lineshapes centered about the peak emission wavelength that were approximately Gaussian with a full width at half maximum of 25 nm-30 nm. For purposes of the calculation, the initial power density of the light sources was kept constant, where power density refers to the integrated power over the full spectrum of the source and is expressed in units of $W/cm^2$.

Figure 9:
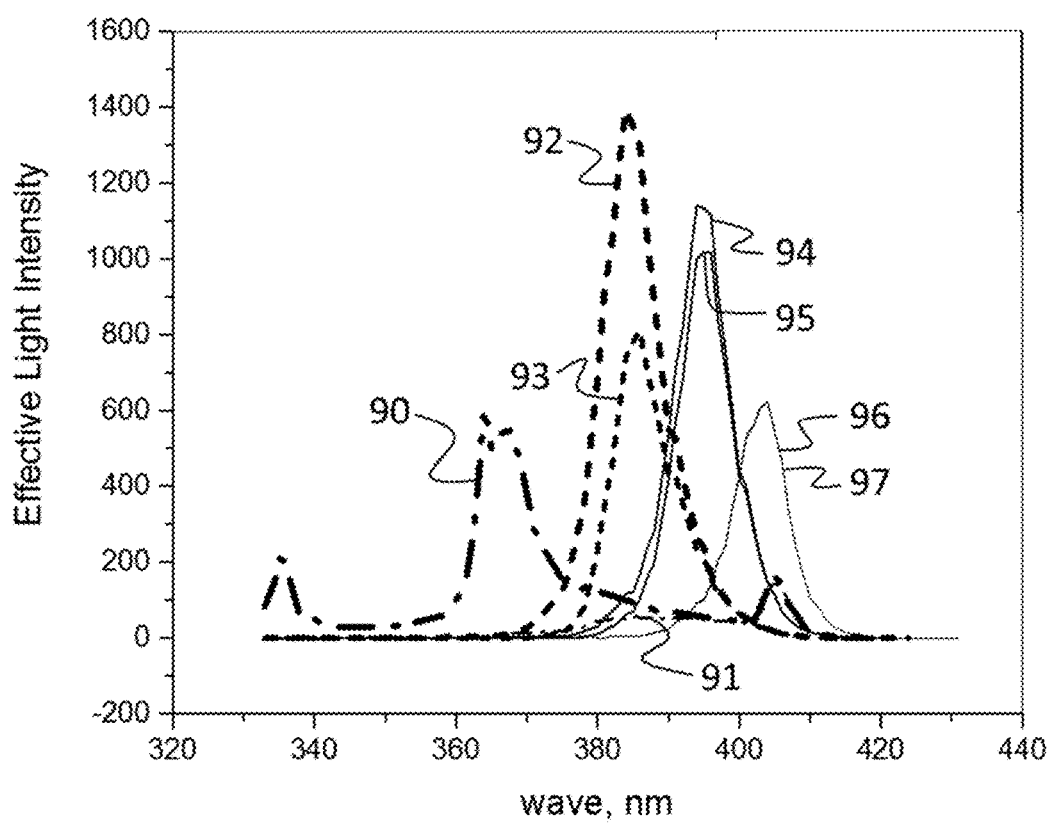
FIG. 9 shows the effective light available to excite TPO photoinitiator from several light sources both in the absence of a UV absorber and in the presence of Tinuvin 1130 UV absorber.
Figure 10:
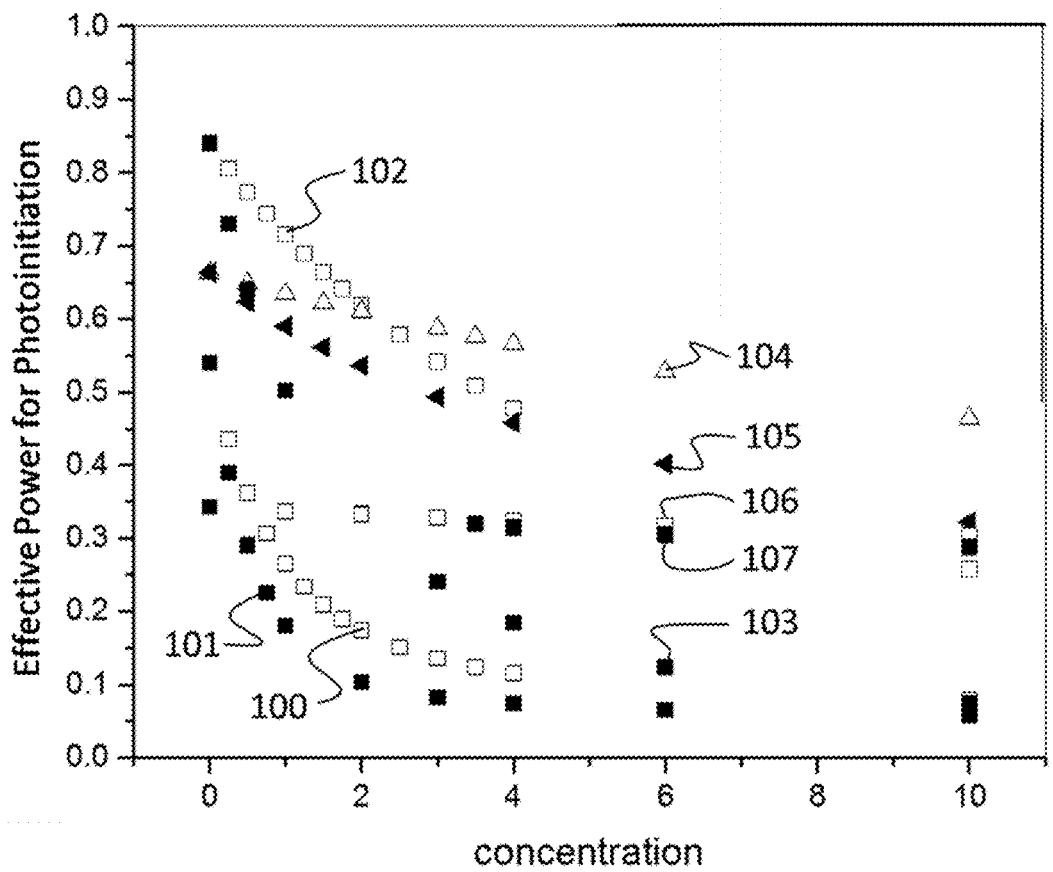
FIG. 10 shows the effective power available to excite TPO photoinitiator for several light sources as a function of concentration of Tinuvin 1130 and JM75A UV absorbers.

The results of the calculation are shown in FIGS. 9 and 10. FIG. 9 shows the effective light intensity available for exciting the TPO photoinitiator as a function of wavelength. The effective TPO excitation light intensity is shown for each of the four light sources both in the presence of the Tinuvin 1130 UV absorber and in the absence of the Tinuvin 1130 UV absorber. Traces 90 and 91 show the effective light intensity available from a Fusion Hg lamp for exciting TPO in the absence and presence of Tinuvin 1130, respectively. The presence of Tinuvin 1130 greatly reduces the intensity available from the Fusion Hg lamp for exciting TPO. Traces 92 and 93 show the effective light intensity available from an LED having a peak emission wavelength of 385 nm at for exciting TPO in the absence and presence of Tinuvin 1130, respectively. Traces 94 and 95 show the effective light intensity available from an LED having a peak emission wavelength of 395 nm at for exciting TPO in the absence and presence of Tinuvin 1130, respectively. Traces 96 and 97 show the effective light intensity available from an LED having a peak emission wavelength of 405 nm at for exciting TPO in the absence and presence of Tinuvin 1130, respectively. The results for the LED light sources indicate as the peak emission wavelength of the LED source shifts to longer wavelength, the effect of Tinuvin 1130 on the energy available for exciting TPO decreases. This result is consistent with the decrease in spectral overlap of the LED light sources with the absorption band of Tinuvin 1130 as the peak emission wavelength of the LED source increases. There is, for example, essentially no spectral overlap of the LED having a peak emission wavelength of 405 nm with the absorption band of Tinuvin 1130. As a result, the presence of Tinuvin 1130 has essentially no effect on the intensity of light available from the 405 nm LED source to excite TPO (as evidenced by the near equivalence of traces 96 and 97 in FIG. 9).

The calculated data shown in FIG. 10 shows the effective power available for exciting the TPO photoinitiator as a function of the concentration of two UV absorbers Tinuvin 1130 and JM75A for the four light sources described in connection with FIG. 9. Data points at a concentration of zero correspond to the effective power in the absence of UV absorbers. Data point sets 100 and 101 show the effective power for photoexcitation of TPO using the Fusion Hg lamp as a function of concentration of Tinuvin 1130 and JM75A, respectively. Data point sets 102 and 103 show the effective power for photoexcitation of TPO using an LED with a peak emission wavelength of 385 nm as a function of concentration of Tinuvin 1130 and JM75A, respectively. Data point sets 102 and 103 show the effective power for photoexcitation of TPO using an LED with a peak emission wavelength of 395 nm as a function of concentration of Tinuvin 1130 and JM75A, respectively. Data point sets 102 and 103 show the effective power for photoexcitation of TPO using an LED with a peak emission wavelength of 405 nm as a function of concentration of Tinuvin 1130 and JM75A, respectively.

The results shown in FIG. 10 show that for each light source, the power available to photoexcite TPO decreases as the concentration of either UV absorber increases. The effect is more pronounced for JM75A than for Tinuvin 1130, which is consistent with the stronger absorbed intensity of JM75A relative to Tinuvin 1130. For the LED sources, the difference between the two UV absorbers decreases as the peak emission wavelength of the LED source increases. This is a consequence of a decrease in spectral overlap of the LED source with the absorption bands of the two UV absorbers as the wavelength of the LED source increases. The spectral overlap of the 405 nm LED with the absorption band of either UV absorber is small. As a result, the decrease in effective power with increasing UV absorber concentration is relatively small for both UV absorbers when using the 405 nm LED and the response of the two UV absorbers becomes more similar (compare data sets 106 and 107). For the 385 nm LED, the spectral overlap of the source with the absorption band of JM75A is much greater than the spectral overlap of the source with the absorption band of Tinuvin 1130. As a result, the decrease in effective power with increasing concentration of UV absorber is much more pronounced for JM75A than for Tinuvin 1130 and there is a significant difference in the response of the two UV absorbers (compare data sets 102 and 103). An intermediate result is seen for the 395 nm LED (compare data sets 104 and 105).

In a final set of experiments, the evolution of mechanical properties with time of exposure to the Fusion Hg lamp was monitored. As the polymerization progresses after initiation of the curing reaction, the average molecular weight of the reaction product increases and the product evolves from a viscous liquid state to a mechanically rigid solid. The evolution from the viscous liquid state to a rigid solid can be monitored by measuring the complex shear modulus (G*) of the primary coating composition as a function of time of continuous exposure of the coating composition to the light source. As the product of the curing reaction becomes more rigid, the complex shear modulus increases.

The kinetics of the curing reaction can be modeled with the rate equation:

$$R_p = -\frac{d[M]}{dt} = k_p[M]I^\beta$$

where $R_p$ is the rate of propagation, [M] is the concentration of acrylate bonds, $k_p$ is a rate constant (which may depend on photoinitiator concentration, temperature and other factors), I is the intensity of the light source, and β is an exponent that depends on the mechanism of termination of the curing reaction. When β=0, the rate of reaction is independent of the intensity of the light source and depends on the time (t) of exposure of the coating composition to the light source. When β>0, the rate of reaction depends on the intensity of the light source in a way that depends on the mechanism of termination. (See E. Andrzejewska, "Photopolymerization kinetics of multifunctional monomers", Progress in Polymer Science, vol. 26, pp. 606-665 (2001))

Figure 11:
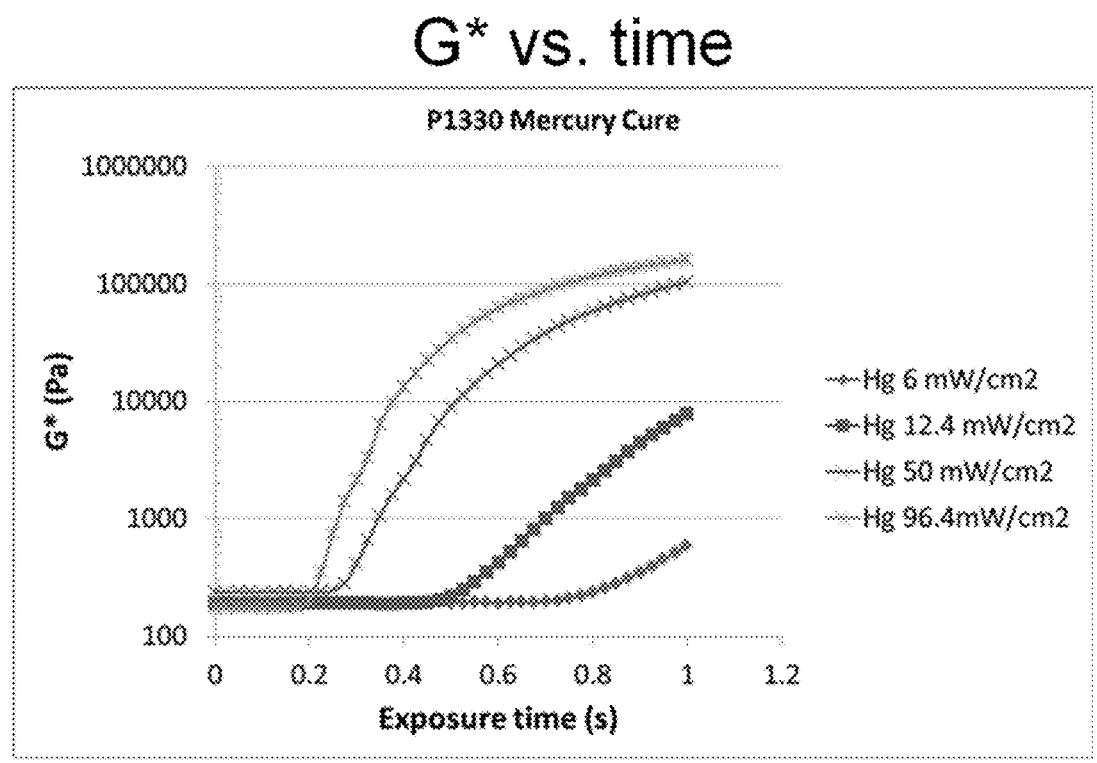
FIG. 11 shows the increase in complex shear modulus (G*) of primary coating composition P1330 as a function of time of exposure to a Fusion Hg lamp at different intensities.

FIG. 11 shows the complex shear modulus of primary coating composition P1330 as a function of time of exposure to a Fusion Hg lamp. Data was obtained at four different intensity levels of the Fusion Hg lamp. The intensity levels and corresponding symbols for data points are shown in the legend at the right side of FIG. 11. Time t=0 corresponds to the time at which the coating composition was exposed to light from the Fusion Hg lamp. For each intensity level, the data show a low complex shear modulus at time zero (consistent with a liquid state) and a period of time over which the complex shear modulus remains low as the curing reaction proceeds. After a critical time of exposure, the complex shear modulus was observed to increase. The increase in complex shear modulus is attributed to a transition of the coating composition from a liquid state to a more rigid solid state as the degree of cure reaches a critical value. The critical time of exposure at which the transition to the solid state initiates varies with the intensity of the light source. As the intensity of the light source increases, the critical time of exposure decreases and the transition to a rigid solid state commences sooner after initiation of the curing reaction.

Figure 12:
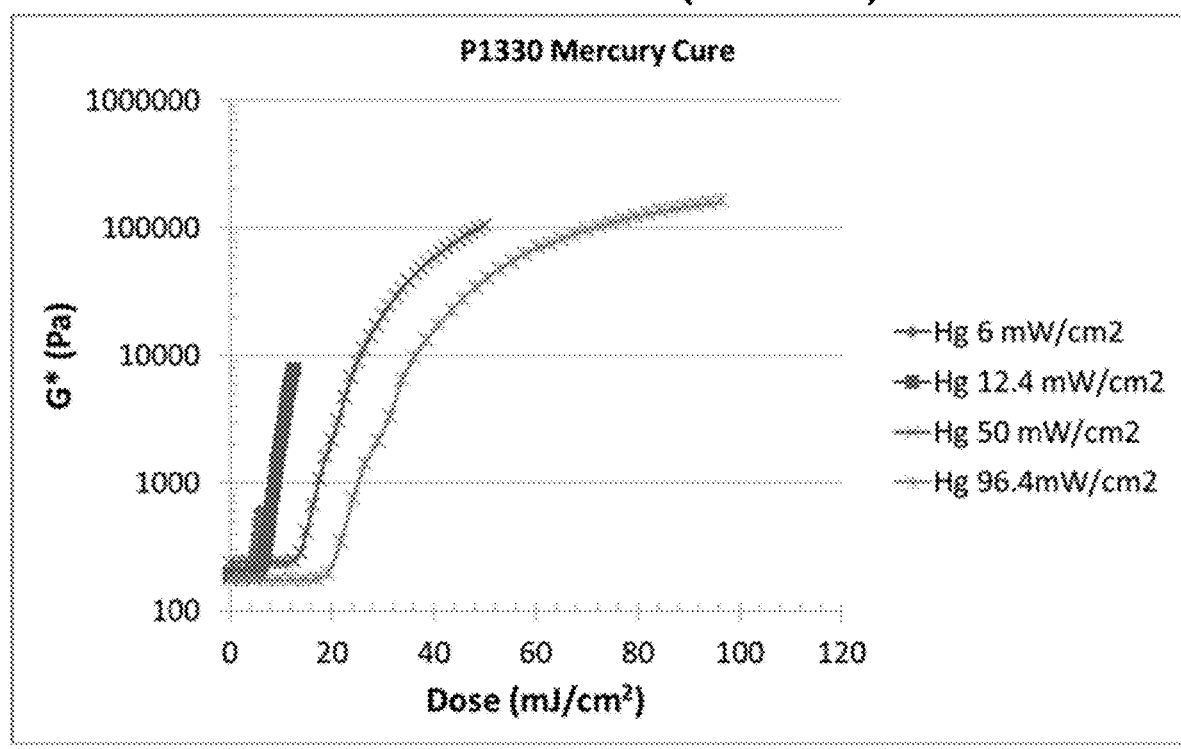
FIG. 12 shows the increase in complex shear modulus (G*) of primary coating composition P1330 as a function of dose (tI) from a Fusion Hg lamp at different intensities.
Figure 13:
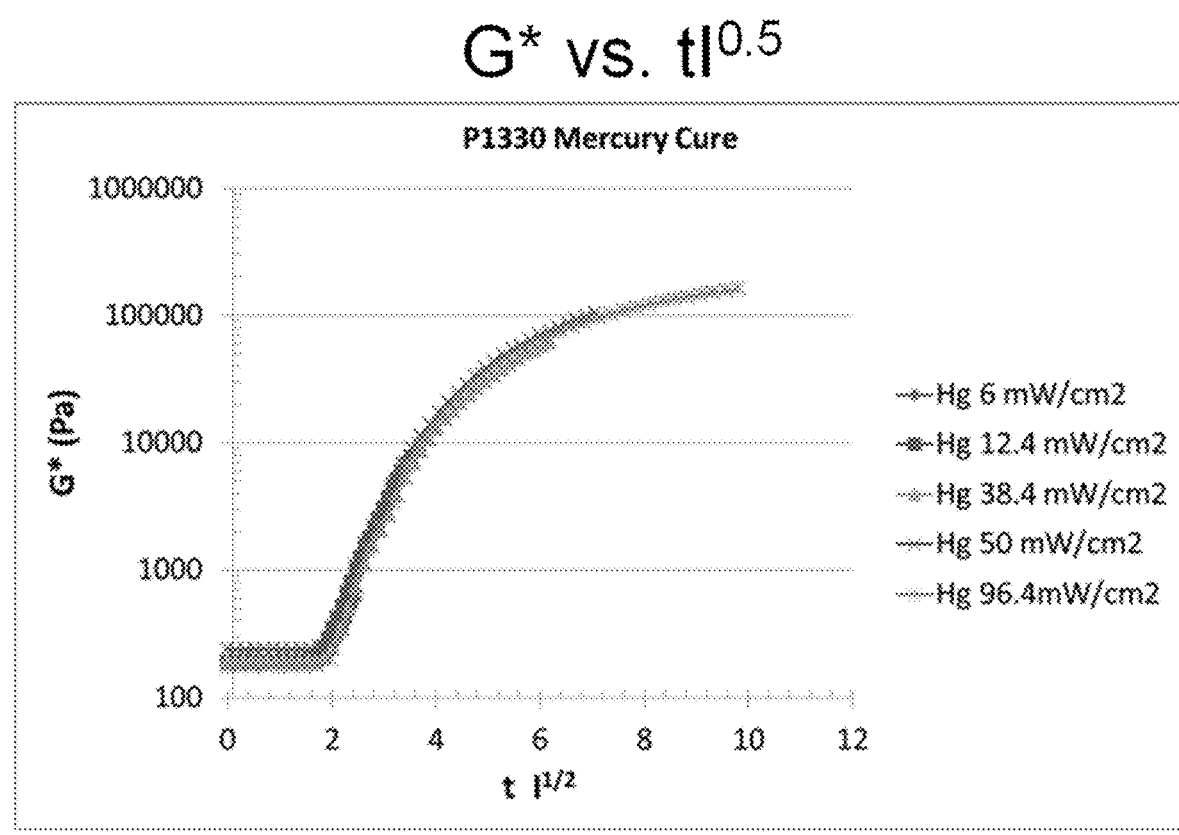
FIG. 13 shows the increase in complex shear modulus (G*) of primary coating composition P1330 as a function of $tI^{0.5}$ upon excitation from a Fusion Hg lamp at different intensities.

FIGS. 12 and 13 present the data shown in FIG. 11 in different ways in an attempt to understand the dependence of the kinetics of the curing reaction on the intensity of the light source. In FIG. 12, the dependence of complex shear modulus on dose is presented. Dose corresponds to the product of time of exposure (t) and the intensity (I) of the light source and is expressed in units of mJ/cm². The results show that the variation of complex shear modulus with dose is more similar for the different source intensities than the variation of complex shear modulus with time shown in FIG. 11. The response at low intensity is similar (where a pronounced increase in complex shear modulus is observed near a dose of 5 mJ/cm² for intensities of 6 mW/cm² and 12.4 mW/cm²), but the similarity in dose response is lost as intensity increases (where the onset of the increase in complex shear modulus is observed near a dose of 12 mJ/cm² and 20 mJ/cm², respectively, for intensities of 50 mW/cm² and 96.4 mW/cm²).

In FIG. 13, the dependence of the complex shear modulus on $tI^{0.5}$ is presented. When the data is represented in terms of the product of exposure time and the square root of intensity, a universal response is obtained for all intensity levels considered.

Figure 14:
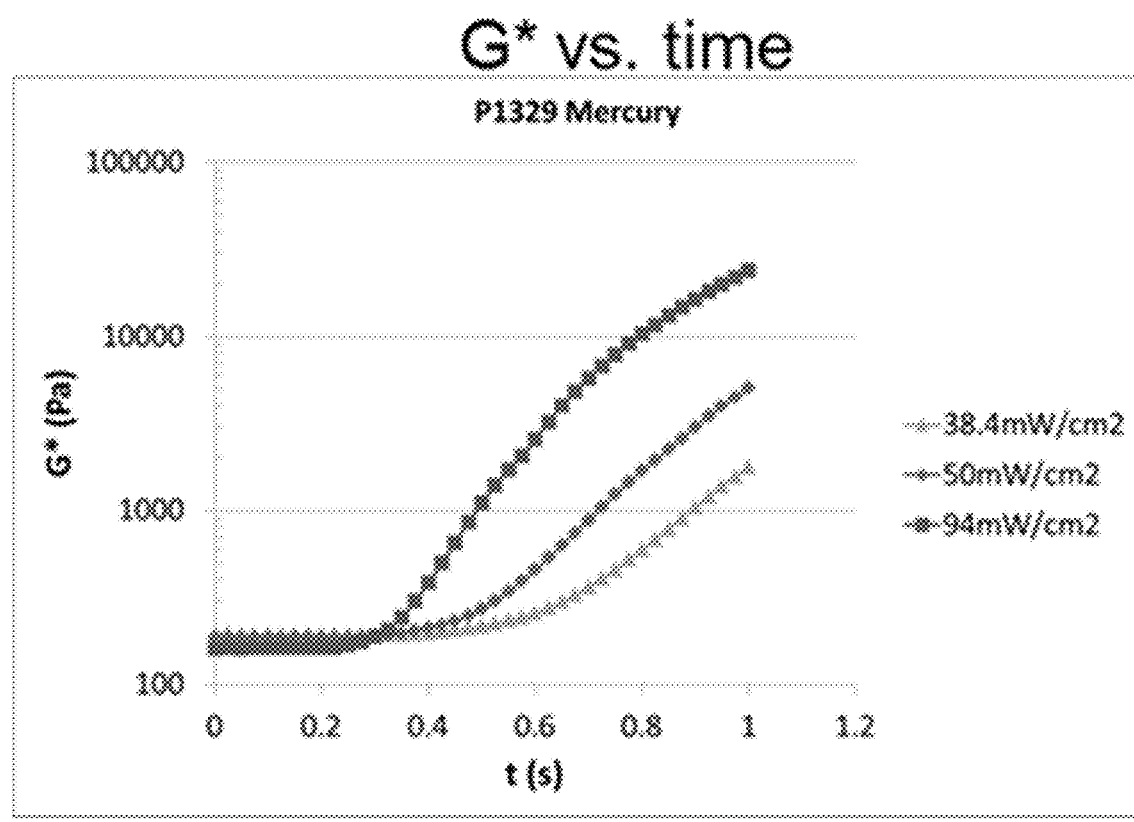
FIG. 14 shows the increase in complex shear modulus (G*) of primary coating composition P1329 as a function of time of exposure to a Fusion Hg lamp at different intensities.
Figure 15:
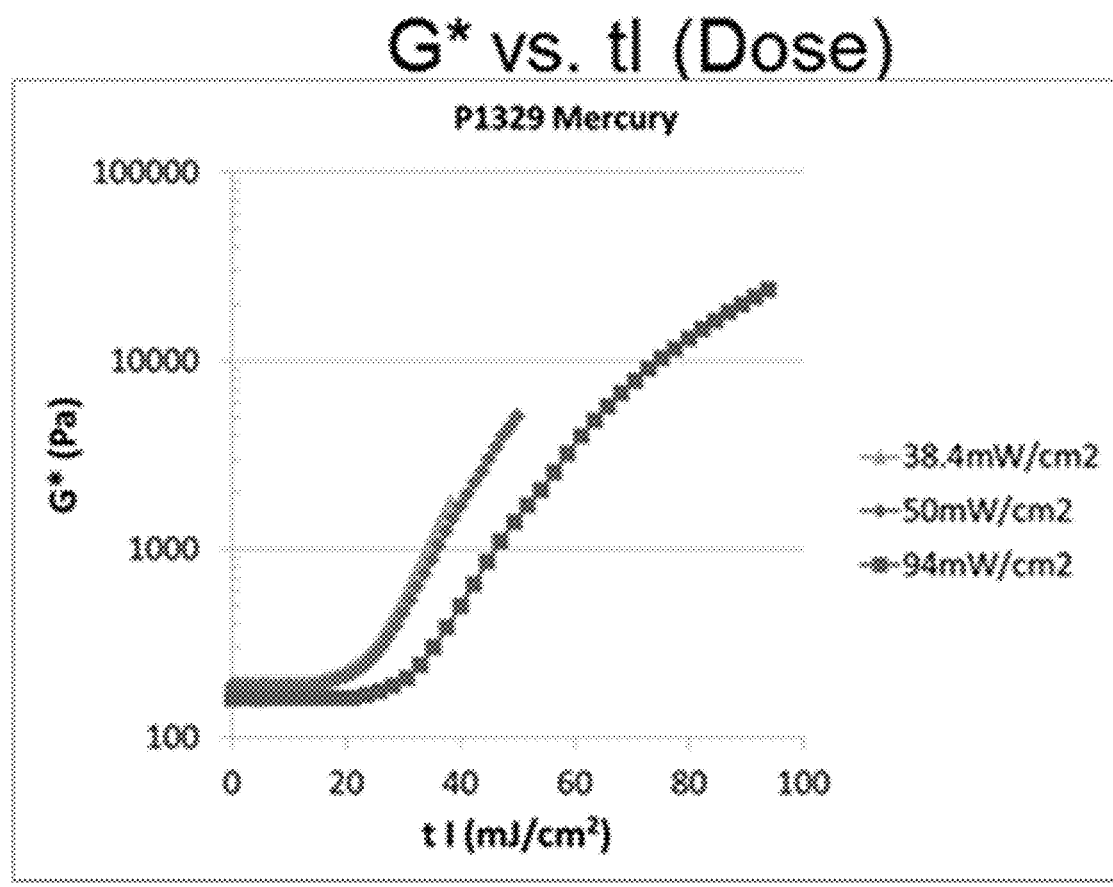
FIG. 15 shows the increase in complex shear modulus (G*) of primary coating composition P1329 as a function of dose (tI) from a Fusion Hg lamp at different intensities.
Figure 16:
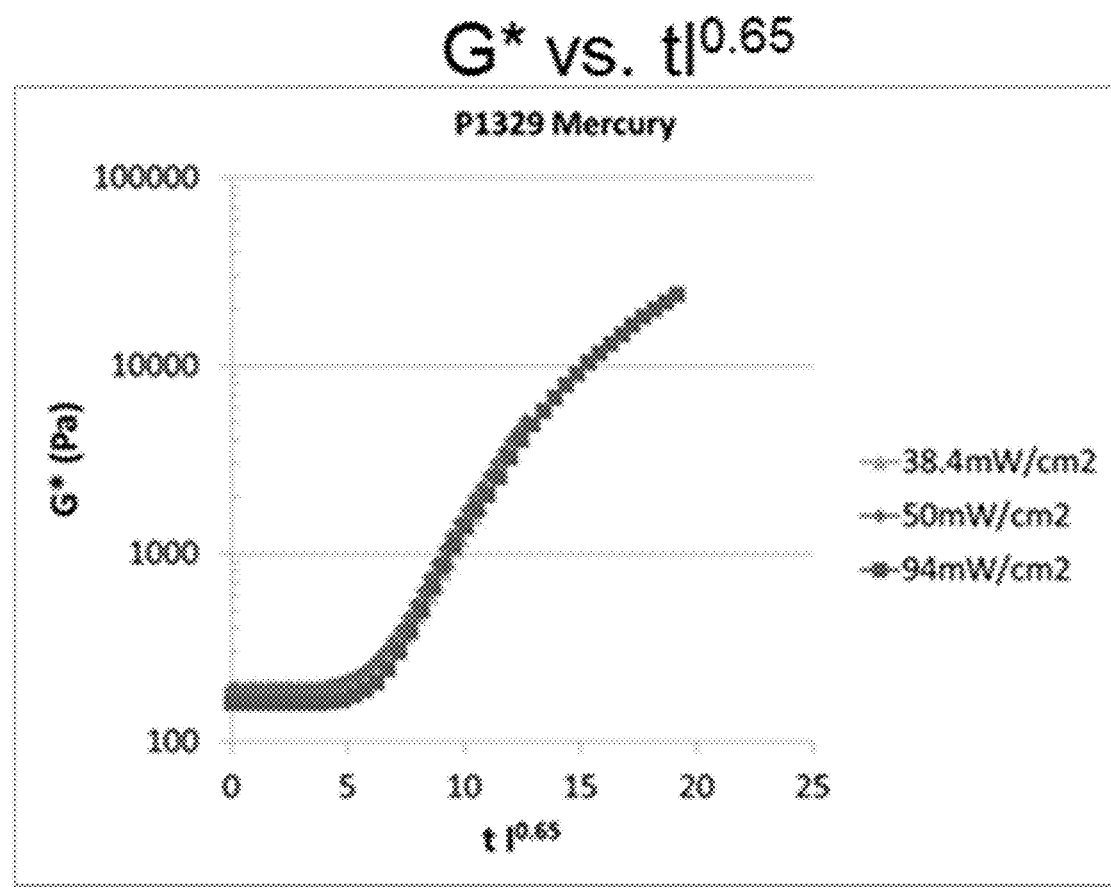
FIG. 16 shows the increase in complex shear modulus (G*) of primary coating composition P1329 as a function of $tI^{0.5}$ upon excitation from a Fusion Hg lamp at different intensities.

FIGS. 14-16 show the variation in complex shear modulus of primary coating composition P1329 as a function of time of exposure to the light source, dose, and $tI^{0.65}$. A Fusion Hg light source was used and data was obtained at different intensity levels. In contrast to primary coating composition P1330, primary coating composition P1329 includes a UV absorber. The presence of the UV absorber decreased the rate of reaction and slowed the evolution of the coating composition from a liquid state to a more rigid solid state. Note, for example, the similarity of time scales shown in FIGS. 11 and 14 and the much lower values of complex shear modulus in FIG. 14 relative to FIG. 11. The qualitative trend observed for the time dependence of complex shear modulus for primary coating composition P1329 is similar to that observed for primary coating composition P1330. An initial time period over which complex shear modulus remained low was followed at a critical time of exposure by a marked increase in complex shear modulus. The increase occurred at shorter times and with higher initial slope as the intensity of the light source was increased.

FIG. 15 shows the dependence of complex shear modulus of primary coating composition P1329 on dose. As observed for primary coating composition P1330 (FIG. 12), the increase in the complex shear modulus of primary coating composition P1329 became more similar at the different intensity levels. The response curves at intensities 38.4 mW/cm² and 50 mW/cm² are very similar, but a deviation was observed at intensity 94 mW/cm². FIG. 16 indicates a common response at the intensity levels considered when complex shear modulus is plotted as a function of $tI^{0.65}$. The difference in the exponent β noted in FIGS. 13 and 16 indicates that the mechanism of termination of the curing reaction changes when a UV absorber is included in the composition.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that numerous modifications and variations can be made to the exemplary embodiments without departing from the intended spirit and scope encompassed by the exemplary embodiments described herein. Thus it is intended that the scope encompassed by the exemplary embodiments covers all modifications and variations that coincide with the scope of the appended claims and their equivalents.

What is claimed is:

1. An optical fiber coating composition comprising:
a base coating composition comprising a first radiation-curable component that is monofunctional, a second radiation-curable component that is multifunctional, a non-radiation curable monomer or oligomer with one or more of urethane, urea, thiourethane, and thiourea groups, and a photoinitiator; and
a UV absorber in a concentration relative to the base coating composition of 1.5 pph to 4.0 pph;
the photoinitiator is capable of absorbing ultraviolet radiation having a wavelength longer than 390 nm; and
the UV absorber is essentially incapable of absorbing ultraviolet radiation having a wavelength longer than 390 nm but is capable of absorbing ultraviolet radiation over a continuous set of wavelengths shorter than 390 nm that extends over at least 50 nm.

2. The optical fiber coating composition of claim 1, wherein said first radiation-curable component comprises an acrylate.

3. The optical fiber coating composition of claim 1, wherein said first radiation-curable component comprises a caprolactone acrylate.

4. The optical fiber coating composition of claim 1, wherein said second radiation-curable component comprises a polyacrylate.

5. The optical fiber coating composition of claim 1, wherein said first radiation-curable component comprises an ethoxylated (8) nonylphenol acrylate.

6. The optical fiber coating composition of claim 1, wherein said second radiation-curable component lacks urethane and urea groups.

7. The optical fiber coating composition of claim 1, wherein said second radiation-curable component includes an ethylenically unsaturated group and a polyol group.

8. The optical fiber coating composition of claim 1, wherein said first radiation-curable component is present in said coating composition in an amount in the range from 50 wt %-85 wt %.

9. The optical fiber coating composition of claim 8, wherein said second radiation-curable component is a bifunctional monomer, said bifunctional monomer being present in said coating composition in an amount in the range from 5 wt %-20 wt %.

10. The optical fiber coating composition of claim 1, wherein said first radiation-curable component comprises an isobornyl acetate.

11. The optical fiber coating composition of claim 1,
wherein the first radiation-curable component comprises an ethoxylated (8) nonylphenol acrylate, a caprolactone acrylate, an isobornyl acetate; and
wherein the second radiation-curable component comprises a tripropylene glycol diacrylate.

12. The optical fiber coating composition of claim 1, wherein said UV absorber includes a moiety derived from benzophenone, benzotriazole, triazine, or substituted forms thereof.

13. The optical fiber coating composition of claim 1, wherein the concentration of the UV absorber relative to the base coating composition is 2.0 pph to 4.0 pph.

14. The cured product of the optical fiber coating composition of claim 1.

15. An optical fiber comprising the cured product of the optical fiber coating composition of claim 1.

16. A method of making an optical fiber comprising:
drawing an optical fiber from a preform;
applying a coating composition to said optical fiber; said coating composition comprising:
a base coating composition comprising a first radiation-curable component that is monofunctional, a second radiation-curable component that is multifunctional, a non-radiation curable monomer or oligomer with one or more of urethane, urea, thiourethane, and thiourea groups, and a photoinitiator; and
a UV absorber in a concentration relative to the base coating composition of 1.5 pph to 4.0 pph; and
curing said coating composition, said curing includes exposing said coating composition to light provided by an LED, said LED having a peak emission wavelength in the range from 360 nm 410 nm;
the photoinitiator is capable of absorbing ultraviolet radiation having a wavelength longer than 390 nm; and
the UV absorber is essentially incapable of absorbing ultraviolet radiation having a wavelength longer than 390 nm but is capable of absorbing ultraviolet radiation over a continuous set of wavelengths shorter than 390 nm that extends over at least 50 nm.

17. A method of making an optical fiber comprising:
drawing an optical fiber from a preform;
applying a primary coating composition to said optical fiber, said primary coating composition comprising:
a base coating composition comprising a first radiation-curable component and a photoinitiator; and
a UV absorber in a concentration relative to the base coating composition of than 1.5 pph to 4.0 pph; and
the photoinitiator is capable of absorbing ultraviolet radiation having a wavelength longer than 390 nm;
the UV absorber is essentially incapable of absorbing ultraviolet radiation having a wavelength longer than 390 nm but is capable of absorbing ultraviolet radiation over a continuous set of wavelengths shorter than 390 nm that extends over at least 50 nm;
curing said primary coating composition, said curing includes exposing said primary coating composition to light provided by an LED, said LED having a peak emission wavelength longer than 390 nm;
applying a secondary coating composition to the optical fiber over the cured primary coating; and
curing the secondary coating composition with Hg UV emitting lamps that emit UV radiation having wavelengths that the UV absorber of the primary coating composition is capable of absorbing.

18. The method of claim 17,
the base coating composition further comprises a second radiation-curable component that is multifunctional, a non-radiation curable monomer or oligomer with one or more of urethane, urea, thiourethane, and thiourea groups; and
the first radiation-curable component is monofunctional.

19. The method of claim 17,
the UV absorber comprises one or more of: avobenzone, octocrylene, 2-(2H-benzotriazol-2-yl)-6-dodecyl-4- methylphenol, and the following compounds of the general formulas (i) and (ii):
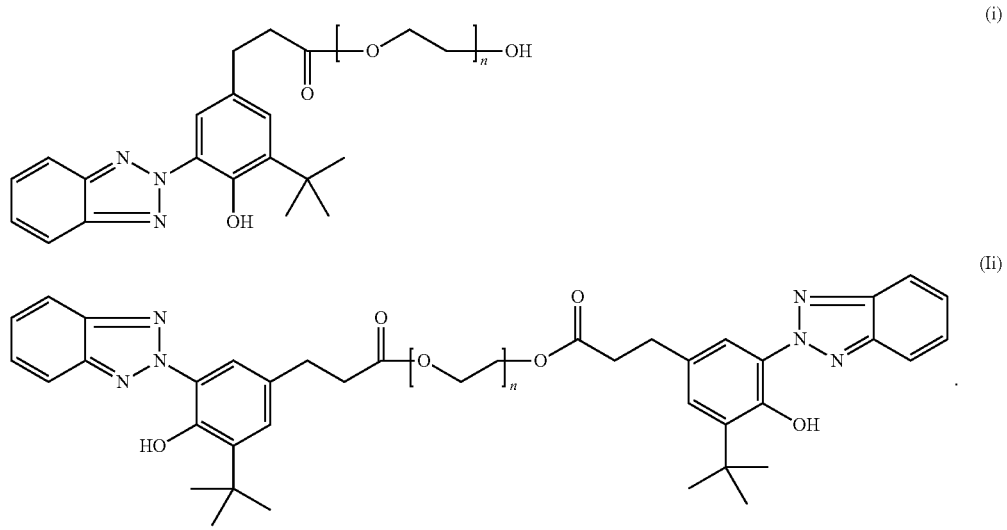
20. The method of claim 17,
the UV absorber comprises avobenzone, octocrylene, or a blend thereof.
* * * * *

UNITED STATES PATENT AND TRADEMARK OFFICE
CERTIFICATE OF CORRECTION

PATENT NO. : 10,640,654 B2
APPLICATION NO. : 15/352057
DATED : May 5, 2020
INVENTOR(S) : Michael Edward DeRosa et al.

Page 1 of 1

It is certified that error appears in the above-identified patent and that said Letters Patent is hereby corrected as shown below:

In the Claims

In Column 44, Line 41 (approx.), Claim 17, after "of" delete "than".

Signed and Sealed this
Eighth Day of September, 2020

Andrei Iancu
*Director of the United States Patent and Trademark Office*